US011538347B2

(12) United States Patent
Ratajczak et al.

(10) Patent No.: US 11,538,347 B2
(45) Date of Patent: Dec. 27, 2022

(54) UAV DELIVERY CONTROL SYSTEM FOR UAV DELIVERY OF PACKAGES

(71) Applicant: Workhorse Group Inc., Loveland, OH (US)

(72) Inventors: Jay Ratajczak, Maineville, OH (US); Scott Wilson, Maineville, OH (US); Wei Wei, Mason, OH (US); Thaddeus M. Bort, Jr., Loveland, OH (US)

(73) Assignee: Workhorse Group Inc., Sharonville, OH (US)

( * ) Notice: Subject to any disclaimer, the term of this patent is extended or adjusted under 35 U.S.C. 154(b) by 260 days.

(21) Appl. No.: 16/934,906

(22) Filed: Jul. 21, 2020

(65) Prior Publication Data

US 2021/0390868 A1 Dec. 16, 2021

Related U.S. Application Data

(60) Provisional application No. 63/038,456, filed on Jun. 12, 2020.

(51) Int. Cl.
*G08G 5/00* (2006.01)
*B64C 39/02* (2006.01)
(Continued)

(52) U.S. Cl.
CPC ......... *G08G 5/0069* (2013.01); *B64C 39/024* (2013.01); *G06Q 10/0832* (2013.01);
(Continued)

(58) Field of Classification Search
CPC .. G08G 5/0069; G08G 5/0013; G08G 5/0039; G08G 5/0052; G08G 5/0086;
(Continued)

(56) References Cited

U.S. PATENT DOCUMENTS 7,673,831 B2    3/2010   Steele et al.
9,051,043 B1    6/2015   Peeters et al.
(Continued)

OTHER PUBLICATIONS

Ground/Air Drone Delivery, DIY Drones, retreived on Aug. 16, 2017, 2 pages.
(Continued)

*Primary Examiner* — Yonel Beaulieu
(74) *Attorney, Agent, or Firm* — Taft Stettinius & Hollister LLP

(57) ABSTRACT

A UAV delivery control system is disclosed. Sensors detect operation parameters associated with the UAV as the UAV maneuvers along an airborne delivery route. A UAV operation controller monitors UAV route parameters as the UAV maneuvers along the airborne delivery route. The UAV route parameters are indicative as to a current environment of the airborne delivery route that the UAV is encountering. The UAV operation controller automatically adjusts the operation of the UAV to maintain the operation of the UAV within an operation threshold based on the operation parameters and the UAV route parameters. The operation threshold is the operation of the UAV that is maintained within an overall airborne operation radius of the UAV from a return destination thereby enabling the UAV to execute the delivery of the package along the airborne delivery route and to return to the return destination.

20 Claims, 6 Drawing Sheets

(51) Int. Cl.
*G06Q 10/00* (2012.01)
*G06Q 10/08* (2012.01)

(52) U.S. Cl.
CPC ..... *G06Q 10/08355* (2013.01); *G08G 5/0013* (2013.01); *G08G 5/0039* (2013.01); *B64C 2201/128* (2013.01); *B64C 2201/208* (2013.01)

(58) Field of Classification Search
CPC ...... G08G 5/0091; G08G 5/006; G08G 5/045; G08G 5/0034; G08G 5/00; B64C 39/024; B64C 2201/128; B64C 2201/208; B64C 2201/141; B64C 39/02; G06Q 10/0832; G06Q 10/08355; G06Q 10/047; G06Q 10/083; G06Q 10/00; G05D 1/102; G05D 1/104; G05D 1/00
See application file for complete search history.

(56) References Cited

U.S. PATENT DOCUMENTS

| | | | |
|---|---|---|---|
| 9,244,147 | B1 | 1/2016 | Soundararajan et al. |
| 9,536,216 | B1* | 1/2017 | Lisso ............... G01C 21/00 |
| 9,915,956 | B2 | 3/2018 | Bokeno et al. |
| 10,351,261 | B1* | 7/2019 | Bryant ............... G07F 11/165 |
| 10,457,392 | B1* | 10/2019 | Evans ............... G06Q 10/083 |
| 10,586,201 | B2 | 3/2020 | Gil et al. |
| 10,916,151 | B2* | 2/2021 | Mulhall ............... G08G 5/0013 |
| 11,348,471 | B2* | 5/2022 | Priest ............... G08G 5/0069 |
| 2002/0156645 | A1 | 10/2002 | Hansen |
| 2005/0204910 | A1* | 9/2005 | Padan ............... B64D 1/04 89/1.813 |
| 2014/0032034 | A1 | 1/2014 | Raptopoulos et al. |
| 2014/0149244 | A1 | 5/2014 | Abhyanker |
| 2014/0254896 | A1 | 9/2014 | Zhou et al. |
| 2015/0370251 | A1 | 12/2015 | Siegel et al. |
| 2016/0068267 | A1 | 3/2016 | Liu et al. |
| 2016/0236778 | A1 | 8/2016 | Takayama et al. |
| 2017/0011340 | A1 | 1/2017 | Gabbai |
| 2017/0160735 | A1 | 6/2017 | Mikan et al. |
| 2017/0190423 | A1 | 7/2017 | Salgueiro et al. |
| 2017/0372256 | A1 | 12/2017 | Kantor et al. |
| 2018/0239363 | A1 | 8/2018 | Yu et al. |
| 2018/0356823 | A1* | 12/2018 | Cooper ............... B64C 39/024 |
| 2019/0043370 | A1* | 2/2019 | Mulhall ............... G01C 21/20 |
| 2019/0079509 | A1* | 3/2019 | Bosworth .......... G06Q 10/0832 |
| 2019/0114564 | A1 | 4/2019 | Ferguson et al. |
| 2020/0046156 | A1* | 2/2020 | Holzer ............... H04W 12/03 |
| 2020/0057991 | A1 | 2/2020 | Afordakos |
| 2020/0207474 | A1* | 7/2020 | Foggia ............... B64C 39/024 |
| 2021/0132625 | A1* | 5/2021 | Gillett ............... B64D 1/22 |
| 2021/0390868 | A1* | 12/2021 | Ratajczak ........ G06Q 10/08355 |

OTHER PUBLICATIONS

Amazon and Drones—Here Is Why It Will Work, Forbes, retreived on Aug. 16, 2017, 4 pages.
International Search Report; ISA/US, Commissioner for Patents; International Application No. PCT/US2021/036799; dated Sep. 22, 2021; 2 pages.
Written Opinion of the International Searching Authority; ISA/US, Commissioner for Patents; International Application No. PCT/US2021/036799; dated Sep. 22, 2021; 14 pages.
Extended European Search Report; European Patent Office; European Application No. 21762587.0; dated Apr. 8, 2022; 9 pages.

* cited by examiner

UAV DELIVERY CONTROL SYSTEM FOR UAV DELIVERY OF PACKAGES

CROSS-REFERENCE TO RELATED APPLICATIONS

This application is a U.S. Nonprovisional Application which claims the benefit of U.S. Provisional Application No. 63/038,456 filed on Jun. 12, 2020, which is incorporated herein by reference in its entirety.

BACKGROUND

Field of Disclosure

The present disclosure generally relates to Unmanned Aerial Vehicles (UAVs) and specifically to an UAV delivery control system for delivery of packages by a UAV.

Related Art

Conventionally, the last mile of delivery of a package in that the last portion of the delivery route for a package in actually delivering the package to the delivery location of the package is done by a delivery truck. Conventionally, the package is initially transported from its initial location via a long range transport option, such as semi-truck or plane, to a warehouse hub that is in proximity of the delivery location of the package. The warehouse hub is in proximity of the delivery location of the package in that that package may then be delivered via the last mile by a delivery truck that executes a delivery route to deliver a load of packages at different delivery locations along the delivery route via the last mile. In doing so, the driver of the delivery truck drives conventionally to each delivery location and walks the package to the delivery location to ultimately deliver the package to the delivery location.

However, the conventional delivery of the packages on the delivery route is obviously limited to the pace in which the driver of the delivery truck is able to deliver each package to each delivery location by driving to each delivery location and then walking to deliver the package to the delivery location. In doing so, additional packages in such conventional approaches are prevented to also being delivered to other delivery locations on the delivery route to supplement the driver delivering the packages as well. Thus, the rate in which packages are delivered on a delivery route in conventional approaches are limited to the speed in which the driver is able to execute the delivering of each package on the delivery route.

Rather than limit the delivering of each package on the delivery route to the speed in which the driver is able to execute such delivering in conventional approaches, an Unmanned Aerial Vehicle (UAV) may supplement the driver in the delivering of packages. The UAV may also deliver packages to delivery locations along the delivery route simultaneously with the driver also delivering packages to delivery locations thereby significantly increasing the speed in which the packages are delivered along the delivery route. However, supplementing the UAV to package delivery also increases the risk of causing damage to property and/or injury as the UAV maneuvers from the delivery truck to the delivery location, delivers the package at the delivery location and then returns to the delivery truck which is likely in a different location than when the UAV initially departed from the delivery truck. To prevent such increased risk while still supplementing the driver in the delivering of packages along the delivery route, the UAV is to operate and abide by the rules and regulations of the FAA such that the UAV operates safely and legally in delivering the package

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 5:
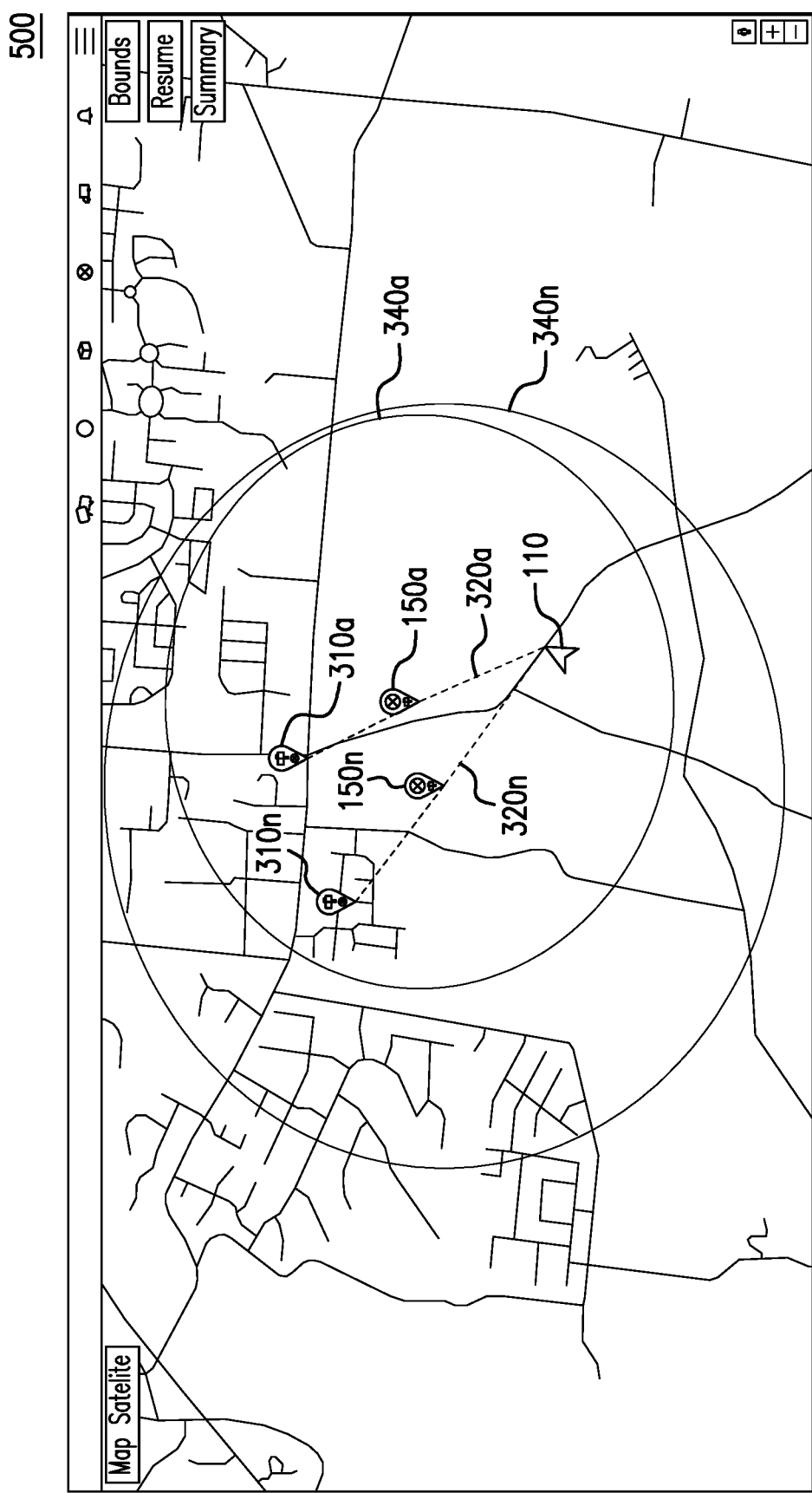
Figure 6:
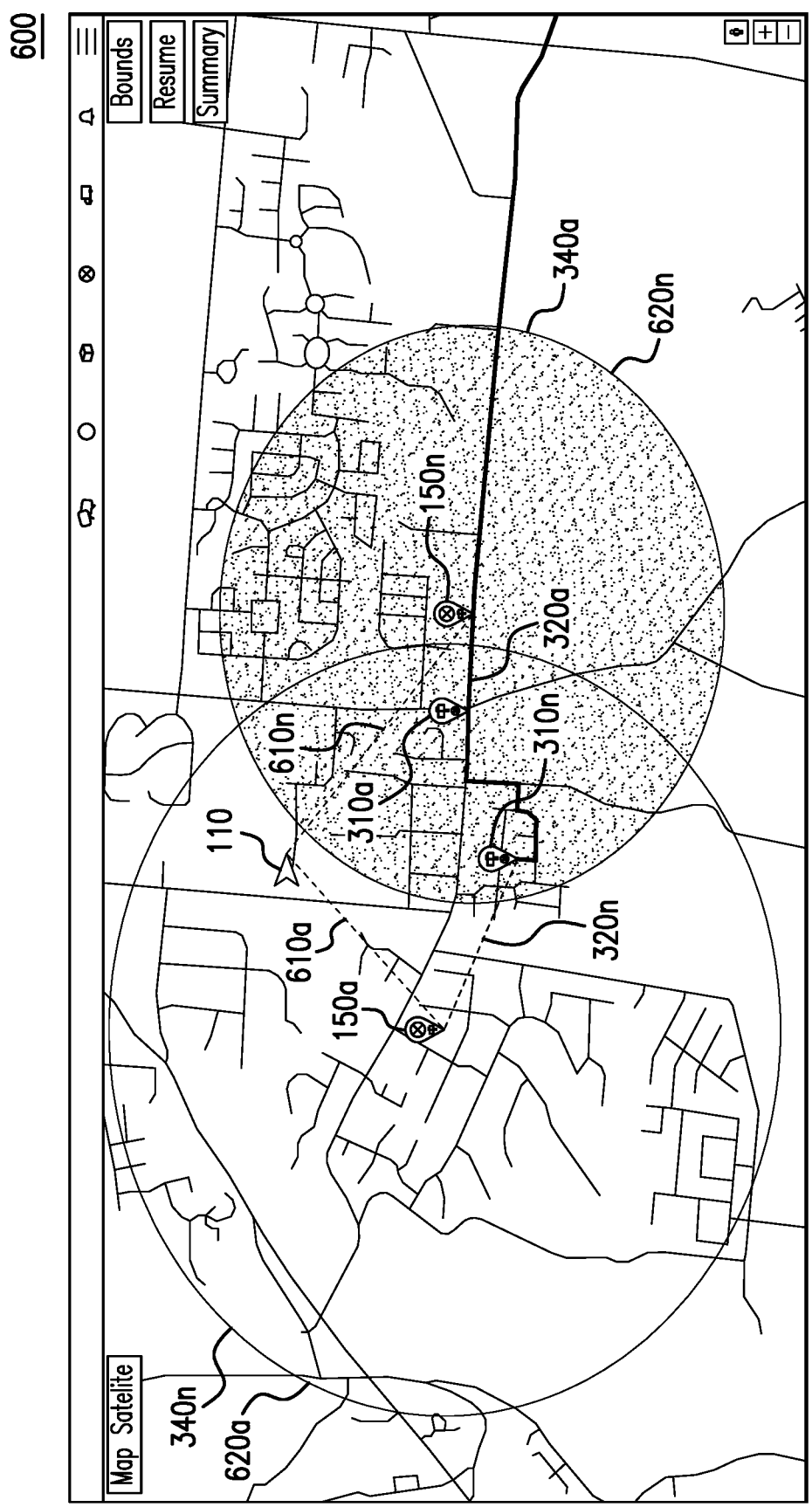

FIG. 5 illustrates a UAV delivery monitoring display that may display to the user via the user interface the UAV delivery monitoring display; and FIG. 6 illustrates a UAV delivery monitoring display that may display to the user via the user interface the UAV delivery monitoring display in real-time that the first UAV that is travelling along the first airborne delivery route and the second UAV travelling along a second airborne delivery route.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

Figure 1:
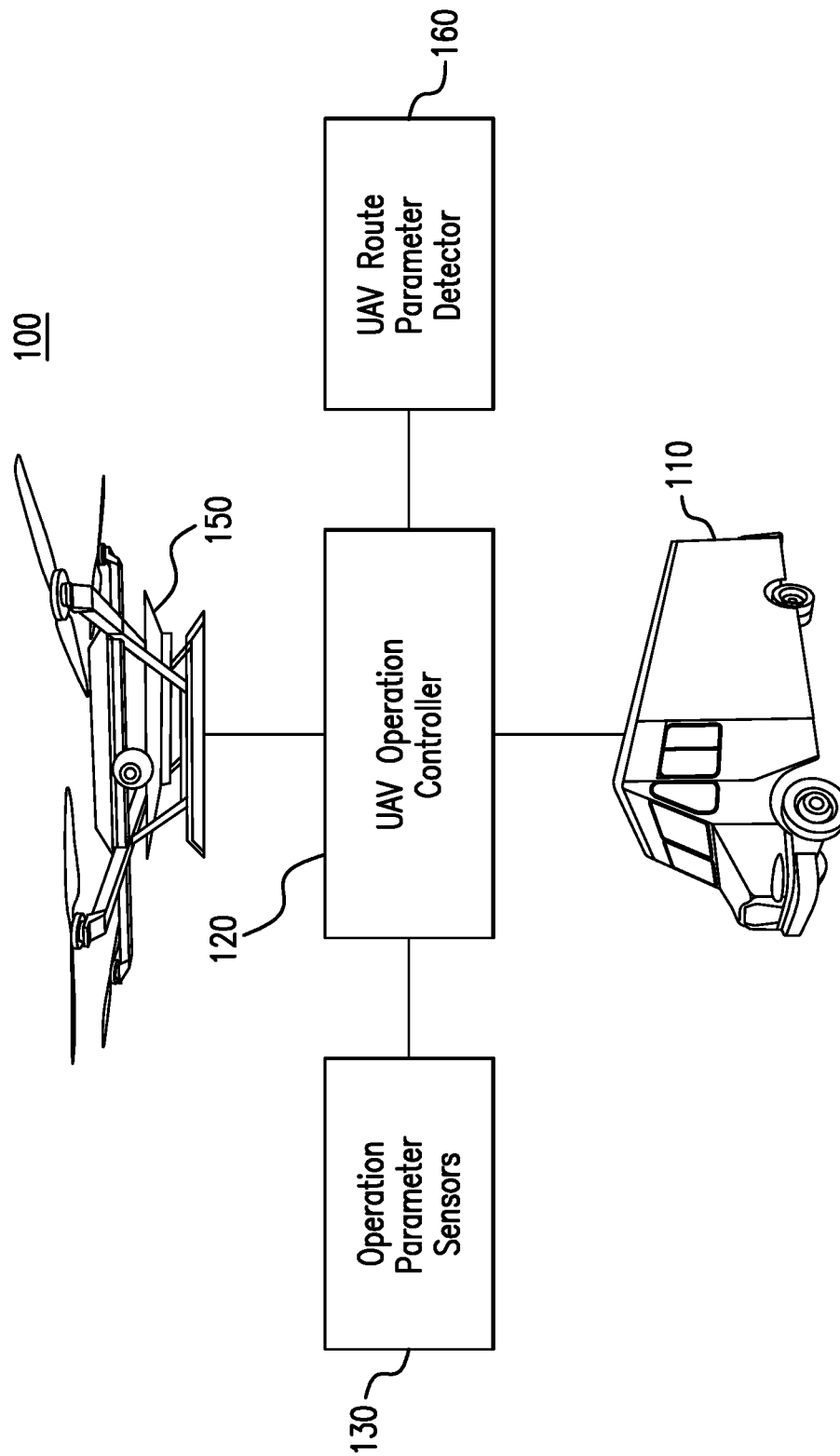
FIG. 1 illustrates a block diagram of an unmanned aerial vehicle (UAV) delivery control system that may automatically manage an operation of an UAV as the UAV operates to deliver a package to a delivery location via an airborne delivery route.

FIG. 1 illustrates a block diagram of an unmanned aerial vehicle (UAV) delivery control system that may automatically manage an operation of an UAV as the UAV operates to deliver a package to a delivery location via an airborne delivery route. An UAV delivery control system 100 includes a delivery truck 110 that may maneuver along a roadway. The delivery truck is a motorized truck with wheels and maneuvers along the roadway that is positioned on the ground such that the wheels maintain contact with the roadway as the wheels rotate from the propulsion of a motor and the delivery truck then maneuvers along the roadway via the rotation of the wheels.

The UAV delivery control system 100 also includes a UAV 150 that may maneuver along an airborne delivery route to deliver a package to a delivery location such that the UAV 150 launches with the package loaded to the UAV 150 and then the UAV 150 travels in flight along the airborne delivery route to the delivery location. In doing so, the UAV 150 is in flight in the air along the airborne delivery route after launching with the package loaded to the UAV 150. The UAV 150 is an aircraft without a human pilot on board that is controlled via an UAV operation controller 120 to travel in flight along the airborne delivery route to deliver the package to the delivery location. For example, the UAV 150 is a quad copter that is capable of transporting a package that weighs up to ten pounds along the airborne delivery route to deliver the package at the delivery location. The UAV 150 may include any type of aircraft without a human pilot on board that is capable of transporting any size package via any airborne delivery route to any delivery location to deliver the package that will be apparent to those skilled in the relevant art(s) without departing from the spirit and scope of the disclosure.

An UAV operation controller 120 may automatically adjust the operation of the UAV 150 as the UAV 150 maneuvers along the airborne delivery route to deliver the package to the delivery location and then maneuvers along the return destination route to return to the return destination for the UAV 150. The airborne delivery route is the route that the UAV 150 travels in the air while in flight to deliver the package to the delivery location. The return destination route is the route that the UAV 150 travels in the air while in flight to return from the delivery location to the destination location after delivering the package at the delivery location. Rather than have the driver of the delivery vehicle 110 and/or a remote operator operate the UAV 150 to execute the airborne delivery route to deliver the package at the delivery location and then the return destination route to return the UAV 150 to the return destination, the UAV operation controller 120 may automatically adjust the operation of the UAV 150 such that the UAV 150 travels from the initial launch location to the delivery location and then to the return destination while accounting for and avoiding obstructions, no-fly zones, and so on such that the UAV 150 may satisfy Federal Aviation Administration (FAA) guidelines and other requirements for safe and reliable operations when doing so.

As the operation of the UAV 150 dynamically changes, the UAV operation controller 120 may automatically adjust the operation of the UAV 150 in response to the dynamically changing operation of the UAV 150 as well as the dynamically changing current environment of the airborne delivery route that the UAV 150 is maneuvering along. In doing so, the UAV operation controller 120 may ensure that the UAV 150 executes an airborne delivery route that may be a direct route between the initial launch location of the UAV 150 and the delivery location to deliver the package. Further, the UAV operation controller 120 may also ensure that the UAV 150 executes a return destination route that may be a direct route between the delivery location and the return destination for the UAV 150. The direct route is a shortest distance that the UAV 150 is authorized to travel between the initial launch location and the delivery location and also between the delivery location and the return destination in that the UAV operation controller 120 may automatically adjust the operation of the UAV 150 to account for the current environment of the airborne delivery route of the UAV 150 which may then trigger a change in the direct route for the UAV 150 to travel. For example, the UAV 150 may encounter a no-fly zone in travelling along the direct route between the initial launch location of the UAV 150 to the delivery location. The UAV operation controller 120 may then automatically adjust the operation of the UAV 150 to avoid the no-fly zone and then in doing so automatically determine an updated, alternate direct route for the UAV 150 to travel to arrive to the delivery location after avoiding the no-fly zone.

The UAV operation controller 120 may automatically adjust the operation of the UAV 150 based on at least one operating parameter sensor 130 that detects at least one operation parameter that is indicative to the operation of the UAV 150 is operating and may change dynamically as the UAV 150 maneuvers along the roadway. As the operation parameters detected by the operation sensors 130 change, the UAV operation controller 120 may automatically adjust the operation of the UAV 150 to accommodate for the dynamic change in the operation parameters to maintain the operation of the UAV 150 within the operation threshold of the UAV 150. In doing so, the UAV 150 may execute the airborne delivery route from the initial launch location in which the UAV 150 is loaded with the package that the UAV 150 is to deliver to the delivery location and travel in flight along the airborne delivery route to the delivery location to deliver the package while still being able to return to the return destination. The return destination is the destination that the UAV 150 is to return to after delivering the package at the delivery location. The return destination may be a fixed location in that the UAV 150 launches from the initial launch location and then returns to the return destination after delivering the package to the delivery location in which the initial location is the same location as the return destination.

However, the return destination of the UAV 150 may be the delivery truck 110 and/or another alternate delivery truck 110, and/or another fixed location such that the UAV 150 supplements the delivery truck 110 in executing the delivering of different packages along the overall delivery route of the delivery truck 110. In doing so, the UAV 150 may launch from the initial launch location which is the initial location of the delivery truck 110 when the package is loaded onto the UAV 150 and the UAV 150 launches from the delivery truck to execute the airborne delivery route. In order to increase the speed and/or efficiency of the driver of the delivery truck 110 in completing the overall delivery route of the delivery truck 110, the driver may then continue on the roadway delivery route and deliver additional packages at additional delivery locations on the roadway delivery route simultaneously as the UAV 150 is executing the delivery of the package to the delivery location on the airborne delivery route. As a result, the speed and/or efficiency of the driver of the delivery truck 110 completing the overall delivery route of the delivery truck 110 is significantly increased as the UAV 150 and the delivery truck 110 delivers different packages to different locations along the overall delivery route of the delivery truck 110 simultaneously.

In an embodiment, the UAV 150 may be associated with several different delivery trucks 110 that maybe executing different overall delivery routes in within an overall airborne operation radius of the UAV 150 in that the UAV 150 may be able reach several different delivery trucks 110 after delivering the package at the delivery location. In doing so, the return destination of the UAV 150 along the return destination route may be a different delivery truck than the initial delivery truck 110 that the UAV 150 initially launched from to conduct the airborne delivery route. As a result, the speed and/or efficiency of the different delivery trucks executing the different overall delivery routes may be increased by the UAV 150 returning to a different delivery truck than the delivery truck 110 that the UAV 150 initially launched from. For example, the UAV 150 initially launches from the delivery truck 110 to execute the airborne delivery route. After the UAV 150 delivers the package to the delivery location, the UAV 150 may then travel to a second delivery truck that is within the overall airborne operation radius as the return destination along the return destination route.

In an embodiment, the UAV 150 may also be associated with several different return destinations that are fixed locations in that the several different fixed locations are within an overall airborne operation radius of the UAV 150 in that the UAV 150 may be able to reach several different fixed locations after delivering the package at the delivery location. In doing so, the return destination along the return destination route may be a different fixed location than the initial delivery truck 110 and/or fixed location that the UAV 150 initially launched from to conduct the airborne delivery route. As a result, the speed and/or efficiency of the different delivery trucks executing the different overall delivery routes and/or delivery to different fixed locations may be increased by the UAV 150 returning to a different fixed location than the delivery truck 110 and/or fixed location that the UAV 150 initially launched from.

For example, the UAV 150 initially launches from a first retail store to execute the airborne delivery route to deliver retail goods at a delivery location of a second retail store. Rather than return to the return destination of the first retail store and/or the delivery truck 110, the UAV 150 may return to the return destination of a third retail store in order to be loaded with a package to deliver required goods to the delivery location of the first retail store. In doing so, the UAV 150 may launch from any fixed location and/or delivery truck and return to any return destination of a fixed location and/or delivery truck in that the fixed locations and/or delivery trucks are within the overall airborne operation radius of the UAV 150 that will be apparent to those skilled in the relevant art(s) without departing from the spirit and scope of the disclosure. As a result, the speed and/or efficiency of the different delivery trucks executing the different overall delivery routes and/or delivery to fixed locations may be increased due to the flexibility of the UAV 150 to return to different return destinations of different delivery trucks and/or fixed locations that the UAV 150 initially launched from.

However, the return destination of the UAV 150 after delivering the package along the airborne delivery route may no longer be the initial launch location from when the UAV 150 initially launched from the delivery truck 110 to execute the airborne delivery route to deliver package to the delivery location. Further, the return destination of the UAV 150 may no longer be the initial delivery truck 110 that the UAV 150 initially launched from but may be a different delivery truck and/or a different fixed location. Rather, the return destination of the UAV 150 after delivering the package along the airborne delivery route often times changes from the initial launch location of the UAV 150 as the delivery truck 110 proceeds along the roadway delivery route to continue to deliver packages at different delivery locations along the roadway delivery route simultaneously as the UAV 150 executes the airborne delivery route. As a result, the return destination of the UAV 150 may be dynamically changing as the delivery truck 110 proceeds along the roadway delivery route as the UAV 150 maneuvers along the return destination route to return to the current location of the delivery truck 110 on the roadway delivery route. The UAV operation controller 120 may ensure that the operation of the UAV 150 is able to not only complete the airborne delivery route in delivering the package from the initial launch location to the delivery location but to also complete the return destination route in returning from the delivery location to the return destination even when the return destination is dynamically changing as the delivery truck 110 travels along the roadway delivery route.

The UAV operation controller 120 may also automatically adjust the operation of the UAV 150 based on at least one UAV route parameter that is indicative as to a current environment of the airborne delivery route that the UAV 150 is encountering and may change dynamically as the UAV 150 maneuvers along the airborne delivery route to deliver the package and then maneuver along the return destination route return to the return destination. The UAV route parameter detector 160 may detect the UAV route parameters as the UAV 150 maneuvers along the airborne delivery route and/or the return destination route. The current environment of the airborne delivery route that the UAV 150 is encountering as the UAV 150 maneuvers along the airborne delivery route and/or the return destination route that impacts how the UAV 150 is to maneuver along the airborne delivery route and/or return destination route. For example, the UAV 150 may encounter a no fly zone along the airborne delivery route and/or return destination route and therefore has to adjust the airborne delivery route to circumvent the no fly zone. As the UAV 150 maneuvers along the airborne delivery route and/or return destination route, the UAV route parameter detector 160 may detect that the current environment of the airborne delivery route may dynamically change and in doing so may impact how the UAV 150 is to maneuver along the airborne delivery route and/or return destination route. Thus, the UAV operation controller 120 may automatically adjust the operation of the UAV 150 based on the dynamically changing current environment such that the UAV 150 may maneuver along the airborne delivery route and/or return destination route to successfully deliver the package to the delivery location while satisfying FAA guidelines.

The UAV operation controller 120 may automatically adjust the operation of the UAV 150 as the UAV 150 maneuvers along the airborne delivery route and/or return destination route to maintain the operation of the UAV 150 within an operation threshold based on the detected operation parameters and electric delivery truck parameters. The operation threshold is the operation of the UAV 150 that is maintained within an overall airborne operation radius of the UAV 150 from a return destination that the UAV 150 is returning to after completing the delivery of the package thereby enabling the UAV 150 to execute the delivery of the package along the airborne delivery route and to return to the return destination.

As the UAV 150 launches from the initial launch location and maneuvers along the airborne delivery route to the delivery location and then maneuvers along the return destination route to return from the delivery location to the return destination, the UAV operation controller 120 may automatically adjust the operation of the UAV 150 to ensure that the UAV 150 is able to deliver the package to the delivery location and return to the return destination. The UAV operation controller 120 may automatically adjust the UAV 150 to maintain the operation of the UAV 150 within the operation threshold such that the UAV 150 may be able to deliver the package to the delivery location and then return to the return destination. In doing so, the UAV operation controller 120 may automatically adjust the UAV 150 as the UAV 150 maneuvers along the airborne delivery route and the return destination route to maintain the UAV 150 within an overall airborne operation radius from the return destination of the UAV 150. The overall airborne operation radius is the distance that the UAV 150 may travel from the return destination to deliver the package to the delivery location while still able to return to the return destination.

The UAV 150 when exceeding the overall operation distance in that the UAV 150 travels beyond the distance that the UAV 150 may no longer be able to return to the return destination while executing the airborne delivery route may result in that the UAV 150 fails to return to the return destination. A failure in returning to the return destination by the UAV 150 may result in significant inefficiency added to the overall delivery route in that the driver of the delivery truck 110 and/or a representative of the delivery company that the delivery truck 110 and the UAV 150 is operating has to locate the UAV 150 to obtain possession of the UAV 150 rather than simply having the UAV 150 land at the return destination. Further, the failure of the UAV 150 in returning to the return destination increases the risk that the UAV 150 may be damaged and/or stolen due to the UAV 150 being exposed and unsupervised. Thus, the UAV operation controller 120 may automatically adjust the operation of the UAV 150 as the UAV 150 maneuvers along the airborne delivery route and the return destination route to ensure that the UAV 150 operations within the operation threshold such that the UAV 150 is maintained within the operation radius of the UAV 150 such that the UAV 150 returns to the return destination after completing the delivery of the package.

As noted above, the UAV operation controller 120 may automatically adjust the operation of the UAV 150 as the UAV 150 maneuvers along the airborne delivery route and/or the return destination route to ensure the operation of the UAV 150 is maintained within the operation threshold based on the operation parameters and the UAV route parameters. As the UAV 150 maneuvers along the airborne delivery route and/or the return destination route, the operation parameters of the UAV 150 may impact the operation threshold of the UAV 150 in that the overall airborne operation radius of the UAV 150 may change as the operation parameters of the UAV 150 change. As noted above, the operation parameters are indicative to an operation of the UAV 150 as the UAV 150 maneuvers along the airborne delivery route and/or the return destination route. The operation parameters provide an indication as to the operation of the UAV 150 in that the operation parameters impact the overall airborne operation radius. In doing so, the operation parameters impact the operation of the UAV 150 thereby impacting the overall airborne operation radius in that the UAV 150 may travel and still return to the return destination after delivering the package.

For example, the UAV operation controller 120 may monitor the operation parameter of the battery voltage of the UAV 150 as the UAV maneuvers along the airborne delivery route and/or the return destination route to determine whether the battery voltage of the UAV 150 decreases below a battery voltage threshold. The battery voltage threshold is the voltage level of the battery that when the battery voltage of the UAV 150 decreases below the battery voltage, the UAV 150 may not have sufficient battery power to return to the return destination after delivering the package. The UAV operation controller 120 may automatically adjust the operation of the UAV 150 when the battery voltage threshold decreases below the battery voltage threshold to ensure that the UAV 150 has adequate battery power to return to the return destination.

As the UAV 150 maneuvers along the airborne delivery route and/or the return destination route, the UAV route parameters may impact the operation threshold of the UAV 150 in that the overall airborne operation radius of the UAV 150 may change as the UAV route parameters of the airborne delivery route and/or the return destination route change. As noted above, the UAV route parameters are indicative as to a current environment of the airborne delivery route that the UAV 150 is encountering as the UAV 150 maneuvers along the airborne delivery route to deliver the package. The UAV route parameters provide an indication as to the operation of the UAV 150 in that the UAV route parameters impact the overall airborne operation radius. In doing so, the UAV route parameters impact the operation of the UAV 150 thereby impacting the overall airborne operation radius in that the UAV 150 may travel and still return to the return destination after delivering the package.

For example, the UAV operation controller 120 may monitor the UAV route parameter of the location of the delivery truck as the UAV 150 maneuvers along the airborne delivery route and/or the return destination route to determine whether the dynamically changing location of the delivery truck 110 relative to the current location of the UAV 150 is within the overall airborne operation radius of the UAV 150. As noted above, the location of the delivery truck may dynamically change as the delivery truck maneuvers to continue to deliver packages at different delivery locations along the delivery route as the UAV 150 delivers the package to the delivery location along the airborne delivery route. The UAV operation controller 120 may automatically adjust the operation of the UAV 150 when the overall airborne operation radius of the UAV 150 is exceeded based on the destination location of the delivery truck 110 relative to the current location of the UAV 150 to ensure that the UAV 150 is within the overall airborne operation radius to return to the return destination of the delivery truck 110.

In order to deliver numerous different packages time and time again along numerous different airborne delivery routes to numerous different delivery locations and then returning to the return destinations along the return destination routes, the UAV operation controller 120 may operate the UAV 150 such that the operation of the UAV 150 in delivering the package and returning to the return destination may be certified to satisfy FAA guidelines. Each time the UAV 150 launches from the initial launch location to deliver the package to the delivery location, the UAV operation controller 120 may operate the UAV 150 such that the UAV 150 satisfies FAA guidelines as the UAV 150 maneuvers along the airborne delivery route to deliver the package at the delivery location as well as returning to the return destination along the return destination route.

In doing so, the UAV operation controller 120 may ensure that the UAV 150 may be able to fly over different terrains such as rural, suburban, and urban terrains while satisfying FAA guidelines. The UAV operation controller 120 may ensure that if the driver of the delivery truck 110 executes an error in operating the delivery truck 110 that the UAV operation controller 120 is still going to satisfy FAA guidelines and/or other elements required for safe and reliable airborne operations in attempting to return to the delivery location of the delivery truck 110. In doing so, the UAV operation controller 120 may operate the UAV 150 to execute the airborne delivery route and/or the return destination route such that the UAV 150 may adequately do so while encountering numerous different operation parameters and/or UAV route parameters such as delivering the package in the daylight, in the dark, in clear and/or favorable weather, in the snow and so on. The UAV operation controller 120 may operate the UAV 150 in delivering the package and/or returning to the return destination in any type of operation parameter, UAV route parameter and/or any other type of parameter that the UAV 150 may encounter while satisfying FAA guidelines when delivering the package and/or returning to the return destination that will be apparent to those skilled in the relevant art(s) without departing from the spirit and scope of the disclosure.

The UAV operation controller 120 may be a device that is capable of electronically communicating with other devices. Examples of the UAV operation controller 120 may include a mobile telephone, a smartphone, a workstation, a portable computing device, other computing devices such as a laptop, or a desktop computer, cluster of computers, set-top box, radio transmitters, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Sensor and Detection Configuration

Figure 2:
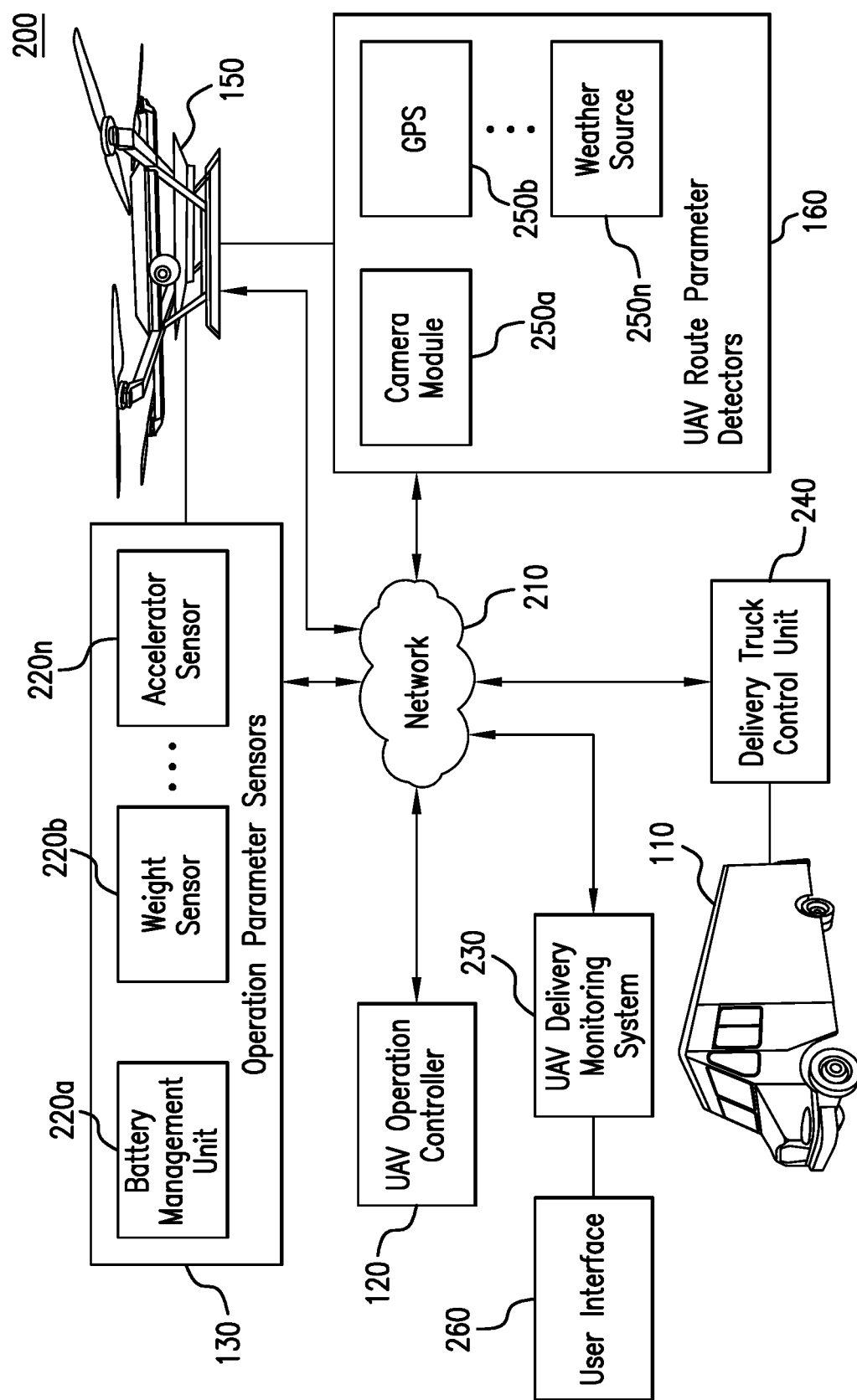
FIG. 2 illustrates a block diagram of an UAV delivery control system that automatically maintains the operation of the UAV within the operation threshold to ensure that the UAV is able to deliver the package to the delivery location along the airborne delivery route and then return to the return destination along the return destination route.

FIG. 2 illustrates a block diagram of an UAV delivery control system that automatically maintains the operation of the UAV 150 within the operation threshold to ensure that the UAV 150 is able to deliver the package to the delivery location along the airborne delivery route and then return to the return destination along the return destination route. An UAV delivery control system 200 includes at least one sensor 220(*a-n*), where n is an integer equal to or greater than one, at least one UAV route parameter detector 250(*a-n*) where n is an integer equal or greater than one, a delivery truck control unit 240, and a network 210. The sensors 220(*a-n*) detect operation parameters associated with the operation of the UAV 150 as the UAV 150 maneuvers along the airborne delivery route and/or return destination route. The UAV route parameter detectors 250(*a-n*) detect UAV route parameters associated with the current environment of the airborne delivery route and/or return destination route as the UAV maneuvers.

Additional operation parameters may be detected via the connection to the network 210. The UAV operation controller 120 may then incorporate the operation parameters and the UAV route parameters into the automatic adjustment of the UAV 150 as the UAV 150 operates. The UAV operation controller 120 may be positioned on the UAV 150. The UAV operation controller 120 may also be positioned remote from the UAV 150. The UAV delivery control system 200 shares many similar features with the UAV delivery control system 100; therefore only the differences between the UAV delivery control system 100 and the UAV delivery control system 200 are to be discussed in further detail.

At least one sensor, such as but not limited to a battery management unit 220*a*, a weight sensor 220*b*, an accelerator sensor 220*n*, and so on are associated with the UAV 150 that maneuvers along the airborne delivery route and/or return destination route. The sensors detect the operation parameters associated with the UAV 150 as the UAV 150 maneuvers along the airborne delivery route and/or return destination route. The operation parameters are indicative to an operating environment of the UAV 150. Further, the UAV route parameter detectors, such as but not limited to a camera module 250*a*, a GPS 250*b*, a weather source 250*n*, and so on are associated with the current environment of the airborne delivery route and/or return destination route as the UAV 150 maneuvers, accordingly. The detectors detect the UAV route parameters associated with current environment of the airborne delivery route and/or return destination route as the UAV 150 maneuvers, accordingly.

The UAV route parameters are defined by and indicative of a current environment of the airborne delivery route and/or return destination route that the UAV 150 is operating. The UAV route parameters may also be defined by and indicative of a forecasted environment of the airborne delivery route and/or return destination route that the UAV 150 is going to operate. The operation parameters and/or the UAV route parameters provide insight to the UAV operation controller 120 as to how the UAV 150 is currently operating such that the UAV operation controller 120 may then incorporate the operation parameters and/or the UAV route parameters into the automatic adjustment of the operation of the UAV 150 to account for the current operation and/or the current environment of the UAV 150 as the UAV 150 maneuvers along the airborne delivery route and/or the return destination route. The sensors 220(*a-n*) detecting operation parameters may also detect UAV route parameters and the detectors 250(*a-n*) detecting UAV route parameters may also detect operation parameters. Further, operation parameters may also be UAV route parameters and UAV route parameters may also be operation parameters.

For example, the operation parameters provide insight as to the current operation of the UAV 150 such as but not limited to the acceleration of the UAV 150, propeller speed, speed of the UAV 150, and so on. The operation parameters may also provide insight as to the electric power consumption of the UAV 150 such as but not limited to the current voltage of the electric battery, acceleration relative to amount of Amps being drawn to support the speed of the UAV 150, state of charge of the electric battery, the temperature of the electric battery, and so on. The operation parameters may include but are not limited to acceleration, deceleration, UAV 150 speed, propeller speed, voltage of the electric battery, motor acceleration relative the amount of Amps being drawn, state of charge of the electric battery, the temperature of the electric battery, weight of the UAV 150, weight of the payload carried by the UAV 150, battery life, and/or any other type of operation parameter that is indicative to the operation of the UAV 150 that will be apparent to those skilled in the relevant art(s) without departing from the spirit and scope of the disclosure.

The UAV route parameters may provide insight as to the current terrain over which the UAV 150 is operating such as the elevation of the terrain, the map of the airborne delivery route and/or return destination route, and so on. The UAV route parameters may also provide insight as to the location of the UAV 150, terrain elevation and rate of elevation change, the current weather that the UAV 150 is encountering, wind that the UAV 150 is encountering, altitude of the UAV 150, barometric pressure and density altitude that the UAV 150 is encountering, the visual depiction of the current environment in which the UAV 150 is operating as provided by a camera module 250*a*, distance the UAV 150 is from obstructions, location of the delivery truck 110, heading of the delivery truck 110, and/or any other type of UAV route parameter that is indicative to the current environment that the UAV 150 is encountering that will be apparent to those skilled in the relevant art(s) without departing from the spirit and scope of the disclosure.

The UAV operation controller 120 may then automatically adjust the operation of the UAV 150 as the UAV 150 maneuvers along the airborne delivery route and/or return destination delivery route to maintain the operation of the UAV 150 within the operation threshold based on the detected operation parameters and/or the UAV route parameters. Each of the numerous operation parameters detected by the sensors 220(*a-n*) and/or UAV route parameters detected by the UAV route parameter detectors 250(*a-n*) may enable the UAV operation controller 320 to automatically adjust the operation of the UAV 150 to accommodate each of the numerous operation parameters and/or UAV route parameters that may be impacting the operation of the UAV 150.

For example, the UAV operation controller 120 may automatically adjust the operation of the UAV 150 as the UAV 150 maneuvers along the airborne delivery route and/or return destination route to maintain the operation of the UAV 150 within the operation threshold based on the operating parameters detected by the battery management unit 220*a*. The UAV 150 may be powered by a battery module that may include one or more electric batteries. The amount of power stored in the battery module and available to be consumed by the UAV 150 as the UAV 150 maneuvers along the airborne delivery route and/or return destination route has an impact on the operation threshold of the UAV 150 in that the overall airborne operation radius of the UAV 150 is based on the amount of power available to the UAV 150. The UAV 150 has an operation threshold with an increased overall airborne operation radius when the battery module is at full capacity with regard to power storage in that the UAV 150 has the maximum amount of power available to maneuver along the airborne delivery route and/or return destination route. The UAV 150 then experiences a decreased operation threshold in that the overall airborne operation radius gradually decreases as the power stored in the battery module is consumed by the UAV 150 thereby gradually decreasing the amount of power available to the UAV 150 to maneuver along the airborne delivery route and/or return destination route. Thus, the overall airborne operation radius remaining gradually decreases corresponding to the gradual decrease of the power stored in the battery module as the UAV 150 continues a given flight.

The battery management unit 220*a* may continuously monitor in real-time different operation parameters associated with the battery module in that the different operation parameters monitored by the battery management unit 220*a* are each indicative as to the power stored in the battery module and available to the UAV 150 to consume. For example, the battery management unit 220*a* may monitor the operation parameter of the battery voltage of the battery module. The battery voltage may be indicative as to the amount of power stored by the battery module and available to the UAV 150 to consume. As the battery module is at full capacity, the battery voltage of the battery module is at an increased voltage level. The battery voltage of the battery module may then gradually have decreased voltage levels as the power stored in the battery module is consumed by the UAV 150 and resulting in less power stored in the battery module and available for the UAV 150 to consume. Thus, the battery management unit 220*a* may monitor the battery voltage of the battery module in real-time to provide an indication as to the power stored in the battery module and available for the UAV 150 to consume in real-time.

In another example, the battery management unit 220*a* may monitor the operation parameter of the battery temperature of the battery module. The battery temperature may also be indicative as to the amount of power stored in the battery module and available to the UAV 150 to consume. As the battery module is at full capacity, the battery temperature of the battery module may be at a decreased battery temperature. The battery temperature of the battery module may then gradually increase as the UAV 150 maneuvers along the airborne delivery route and/or the return destination delivery route in that the UAV 150 is consuming power stored in the battery module. In doing so, the battery temperature of the battery module may gradually increase as the UAV 150 continues to maneuver thereby continuing to consume power stored in the battery module resulting in the gradual increase of battery temperature of the battery module. The gradual increase of the battery temperature of the battery module corresponds to a gradual decrease in the power stored in the battery module as the duration in which the UAV 150 is maneuvering increases the amount of power consumed by the UAV 150 increases and the amount of power stored in the battery module and available for the UAV 150 to consume decreases. Thus, the battery management unit 220*a* may monitor the battery temperature of the battery module in real-time to provide an indication as to the power stored in the battery module and available for the UAV 150 to consume in real-time.

In another example, the battery management unit 220*a* may monitor the operation parameter of the quantity of cycles the battery module has undergone as an indicator of the battery life of the battery module. The battery life may also be indicative as to the amount of power stored in the battery module and available for the UAV 150 to consume. Each cycle that the battery module undergoes, the amount of power stored in the battery module and available to the UAV 150 to consume slowly decreases. As the quantity of cycles that the battery module increases, the amount of power stored in the battery module and available to the UAV 150 to consume slowly decreases until eventually the battery module is no longer operational for the UAV 150. Thus, the battery management unit 220*a* may monitor the quantity of cycles that the battery module has undergone in real-time to provide an indication as to the power stored in the battery module and available for the UAV 150 to consume in real-time. The battery management unit 220*a* may monitor any type of operation parameter that is indicative as to the amount of power stored in the battery module and available to the UAV 150 to consume in real-time that will be apparent to those skilled in the relevant art(s) without departing from the spirit and scope of the disclosure.

The UAV operation controller 120 may then automatically adjust the operation of the UAV 150 as the UAV 150 maneuvers along the airborne delivery route and/or the return destination route based on the operation parameters associated with the power stored in the battery module as monitored by the battery management unit 220*a* in real-time. As the power stored in the battery module and available to the UAV 150 to consume decreases from the consumption of the power by the UAV 150 as the UAV 150 maneuvers in real-time, the UAV operation controller 120 may automatically adjust the operation threshold of the UAV 150 based on the power stored in the battery module and available to the UAV 150 to consume. In adjusting the operation threshold of the UAV 150, the UAV operation controller 120 may automatically determine the overall airborne operation radius of the UAV 150 as the UAV 150 maneuvers along the airborne delivery route and/or the return destination route in real-time.

As the UAV 150 maneuvers, the UAV 150 continuously consumes power stored in the battery module thereby resulting in a gradual decrease in the power stored in the battery module and available for the UAV 150 to consume as the UAV 150 continues to maneuver along the airborne delivery route and/or the return destination route. In doing so, the overall airborne operation radius of the UAV 150 also continues to gradually decrease as the UAV 150 maneuvers due to the gradual decrease in the power stored by the battery module and available for the UAV 150 to consume. The UAV operation controller 120 may continuously determine the overall airborne operation radius of the UAV 150 based on the power stored in the battery module as monitored by the battery management unit 220*a*. The UAV operation controller 120 may then automatically adjust the operation of the UAV 150 as the UAV 150 maneuvers along the airborne delivery route and/or return destination route to ensure that the UAV 150 is maintained within the overall airborne operation radius to ensure the UAV 150 is able to return to the return destination. As the UAV 150 continues to maneuver, the power stored in the battery module and available to the UAV 150 to consume gradually decreases resulting in the overall airborne operation radius of the UAV 150 to gradually decrease and the UAV operation controller 120 then continues to adjust the operation of the UAV 150 to ensure that the UAV 150 is maintained within the overall airborne operation radius as the UAV 150 maneuvers. The UAV operation controller 120 may also simultaneously provide the data associated with the power consumption as the UAV operation controller 120 monitors the power consumption of the UAV 150 to the user.

For example, the UAV operation controller 120 may automatically adjust the operation of the UAV 150 as the UAV 150 maneuvers along the airborne delivery route and/or the return destination route based on the battery voltage of the battery module as monitored by the battery management unit 220*a* in real-time. In doing so, the UAV operation controller 120 may continuously determine the overall airborne operation radius of the UAV 150 in real-time based on the battery voltage of the battery module. As the battery voltage of the battery module decreases, the UAV operation controller 120 may automatically determine the impact in the decrease in power stored in the battery module and available for the UAV 150 to consume on the overall airborne operation radius. As the battery voltage of the battery module decreases, the power stored in the battery module and available for the UAV 150 to consume decreases thereby resulting in a decrease in the overall airborne operation radius of the UAV 150. The UAV 150 may then automatically adjust the operation of the UAV 150 to maintain the UAV 150 within the overall airborne operation radius to ensure that the UAV 150 is able to return to the return destination based on the battery voltage of the battery module.

As noted above, each of the numerous operation parameters detected by the sensors 220(*a-n*) and/or UAV route parameters detected by the UAV route parameter detectors 250(*a-n*) may enable the UAV operation controller 220 to automatically adjust the operation of the UAV 150 to accommodate each of the numerous operation parameters and/or UAV route parameters that may be impacting the operation of the UAV 150. For example, the UAV operation controller 120 may automatically adjust the operation of the UAV 150 as the UAV 150 maneuvers along the airborne delivery route and/or return destination route to maintain the operation of the UAV 150 within the operation threshold based on the UAV route parameters detected by the GPS 250b. The location of the UAV 150 in real-time relative to the location of the return destination in real-time is a UAV route parameter that is indicative of the current environment that the UAV 150 is operating and has an impact on the operation threshold of the UAV 150 in that the overall airborne operation radius of the UAV 150 is based on the location of the UAV 150 in real-time relative to the location of the return destination in real-time. The UAV 150 has an operation threshold that is based on the overall airborne operation radius and the UAV operation controller 120 may automatically adjust the operation of the UAV 150 to maintain the location of the UAV 150 in real-time relative to the location of the return destination in real-time to be within the overall airborne operation radius.

The GPS 250b may continuously monitor in real-time the different UAV route parameters associated with the location of the UAV 150 as well as the location of the return destination in that the location of the UAV 150 and the location of the return destination of the UAV 150 is in indicative as to whether the UAV 150 is positioned within the overall airborne operation radius. For example, the GPS 250b may provide the location of the UAV 150 in real-time as well as the position of the delivery truck 110 in real-time to the UAV operation controller 120. As noted above, the location of the delivery truck 110 may be dynamically changing as the delivery truck 110 executes the roadway delivery route as the UAV 150 is executing the airborne delivery route. As the delivery truck 110 is executing the roadway delivery route, the delivery truck 110 may move beyond the overall airborne operation radius of the UAV 150 as the UAV 1150 is executing the airborne delivery route. Thus, the GPS 250b may monitor the location of the UAV 150 in real-time as well as the location of the return destination in real-time to provide an indication to the UAV operation controller 120 as to whether the UAV 150 is within the overall airborne operation radius from the return destination.

The UAV operation controller 120 may then automatically adjust the operation of the UAV 150 as the UAV 150 maneuvers along the airborne delivery route and/or the return destination route based on the UAV route parameters associated with the location of the UAV 150 relative to the location of the return destination in real-time. As the location of the UAV 150 relative to the location of the return destination exceeds the overall airborne delivery route, the UAV operation controller 120 may automatically adjust the operation threshold of the UAV 150 to ensure that the location of the UAV 150 is within the overall airborne operation radius from the location of the return destination in real-time. For example, the UAV operation controller 120 may automatically adjust the airborne delivery route and/or the return destination route that the UAV 150 is maneuvering when the current location of the delivery truck 110 is beyond the overall airborne operation radius of the UAV 150 as the delivery truck 110 executes the roadway delivery route.

The camera module 250a detects different UAV route parameters that are associated with the electric delivery truck 110 as the electric delivery truck 110 maneuvers along the roadway. The UAV route parameters detected by the camera module 250a are visually identifiable as detected by the camera module 250a and are indicative to the current environment that the UAV 150 is maneuvering. The camera module 250a may detect numerous UAV route parameters that impact the current environment of the UAV 150 as the UAV 150 maneuvers along the airborne delivery route and/or the return destination route. The UAV route parameters of the current environment of the UAV 150 as detected by the camera module 250a may include tangible characteristics of the current environment of the UAV 150 that may be visually detected and/or identified by the camera module 250a such that the UAV operation controller 120 may adequately adjust the operation of the UAV 150 based on the UAV route parameters detected by the camera module 250a. Such UAV route parameters may provide the UAV operation controller 120 with the insight as to the tangible and/or visually identifiable aspects of the current environment that the UAV 150 is maneuvering.

The UAV operation controller 120 may then identify the UAV route parameters as detected by the camera module 250a in real-time as the UAV 150 maneuvers along the airborne delivery route and/or return destination route. The UAV operation controller 120 may determine an impact that each of the UAV route parameters detected by the camera module 250 are having on the operation of the UAV 150. The UAV operation controller 120 may automatically adjust the operation of the UAV 150 as the UAV 150 maneuvers along the airborne delivery route and/or the return destination route to maintain the operation of the UAV 150 within the operation threshold to accommodate for each of the UAV route parameters detected by the camera module 250a as each UAV route parameter impacts the operation of the UAV 150 in real-time.

In an embodiment, the camera module 250a may include a forward facing camera and a downward facing camera. The forward facing camera may be positioned on the UAV 150 such that the forward facing camera may capture the current environment that is in front of the UAV 150 as the UAV 155 operates. The front of the UAV 150 is the direction that the UAV 150 is facing when maneuvering in a forward operation that is opposite of when the UAV 150 is maneuvering in a rear operation. The downward facing camera may be positioned on the UAV 150 such that the downward facing camera may capture the current environment that is below the UAV 150 as the UAV 150 operates. Below the UAV 150 is the direction facing towards the ground as the UAV 150 is maneuvering in flight in the air.

The camera module 250a may continuously monitor in real-time the different UAV parameters associated with the current environment that the UAV 150 is maneuvering based on the different UAV parameters captured by the camera module 250a. For example, the forward facing camera included in the camera module 250a may capture obstacles that may be positioned in the airborne delivery route and/or the return destination route that the UAV 150 is currently maneuvering in a horizontal direction in that the UAV 150 is travelling parallel to the ground. In capturing images of the obstacles positioned in the airborne delivery route and/or the return destination route that the UAV 150 may be encountering in real-time, the UAV operation controller 120 may then automatically adjust the operation of the UAV 150 such that the UAV 150 maneuvers around each obstacle that is captured by the front facing camera of the camera module 250a. In doing so, the UAV operation controller 120 may automatically adjust the operation of the UAV 150 to avoid any obstacles captured by the front facing camera of the camera module 250a as the UAV 150 maneuvers along the airborne delivery route and/or the return destination route. The UAV operation controller 120 may also notify the user of the obstacle captured by the camera module 250a.

In another example, the downward facing camera included in the camera module 250a may captured obstacles that may be positioned below the UAV 150 as the UAV 150 ascends and/or descends in that the UAV 150 is ascending and/or descending perpendicular to the ground. In such an example, the downward facing camera included in the camera module 250*a* may capture obstacles positioned below the UAV 150 as the UAV 150 descends to deliver the package at the delivery location and/or to descend to the return destination location. In capturing images of the obstacles positioned as the UAV 150 ascends and/or descends and in particular when the UAV 150 is descending onto the delivery location and/or return destination location that the UAV 150 may be encountering in real-time, the UAV operation controller 120 may then automatically adjust the operation of the UAV 150 such that the UAV 150 does not descend onto any obstacle positioned in the descent of the UAV 150 that is captured by the downward facing camera of the camera module 250*a*. The UAV operation controller 120 may also notify the user of the adjustment in flight path to avoid the obstacle. In doing so, the UAV operation controller 120 may automatically adjust the operation of the UAV 150 to avoid any obstacles captured by the downward facing camera of the camera module 250*a* as UAV 150 descends onto the delivery location and/or return destination location.

The UAV operation controller 120 may incorporate the numerous operation parameters as detected by the several different operation parameter sensors 220(*a-n*) and the numerous UAV route parameters as detected by the several different UAV route parameter detectors 250(*a-n*) simultaneously in automatically adjusting the operation of the UAV 150 in real-time as the UAV 150 maneuvers along the airborne delivery route and/or the return destination route. In doing so, the UAV operation controller 120 may account for the numerous different operation parameters and the numerous different UAV route parameters simultaneously into the automatic adjustment of the operation of the UAV 150 in that the each of the numerous different operation parameters and UAV route parameters may simultaneously impact the operation of the UAV 150 in real-time.

Thus, the UAV 150 may maneuver along the airborne delivery route and/or the return destination route as operated by the UAV operation controller 120 to account for the changing operation parameters and UAV route parameters in real-time to continuously maintain the operation of the UAV 150 within FAA requirements and those elements required for safe and efficient operations. Real-time is the status of the operation parameters and the UAV route parameters during the period of time in which the UAV operation controller 120 evaluates operation parameters and the UAV route parameters relative to the current status of the UAV 150. In an embodiment the period of time in which the UAV operation controller 120 evaluates is every one second. However, real-time may be any period of time in which the UAV operation controller 120 evaluates the operation parameters and the UAV route parameters relative to the current status of the UAV 150 that will be apparent to those skilled in the relevant art(s) without departing from the spirit and scope of the disclosure.

UAV Delivery Monitoring Configuration

An UAV delivery monitoring system 230 may monitor the UAV 150 as well as the numerous operation parameters and/or UAV route parameters associated with the UAV 150 as the UAV 150 operates along the airborne delivery route and/or return destination route. The UAV delivery monitoring system 230 may also monitor the delivery truck 110 as well as the numerous delivery truck parameters associated with the UAV 150 as the UAV 150 operates as the delivery truck 110 executes the roadway delivery route. The UAV delivery monitoring system 230 may then provide insight as to the operation of the UAV 150 and the delivery truck 110 such that the UAV 150 and the delivery truck 110 may execute the overall delivery route in an optimized manner to decrease the duration required to execute the overall delivery route. In doing so, the UAV operation controller 120 may then adjust the operation of the UAV 150 and the UAV delivering monitoring system 230 may then route the delivery truck 110 based on the monitored operation parameters, the UAV route parameters, and/or the delivery truck parameters thereby optimizing the duration of time required for the driver of the delivery truck 110 to execute the overall delivery route. The UAV operation controller 120 may also adjust the operation of the UAV 150 to return to a second delivery truck based on the monitored operation parameters, the UAV route parameters and/or the delivery truck parameters thereby optimizing the duration of time required for the different drivers of the different delivery trucks executing different overall delivery routes within the overall airborne operation radius of the UAV 150. The UAV operation controller 120 may also adjust the operation of the UAV 150 to return to a different fixed location based on the monitored operation parameters, the UAV route parameters and/or delivery truck parameters thereby optimizing the duration of time required for the different drivers of the different delivery trucks executing different overall delivery routes within the overall airborne operation radius of the UAV 150 as well as the delivery of packages to different fixed locations within the overall airborne operation radius of the UAV 150.

The UAV delivery truck monitoring system 230 may monitor the numerous operation parameters as detected by the operation parameter sensors 220(*a-n*), the numerous UAV route parameters as detected by the UAV route parameter detectors 250(*a-n*), and the numerous delivery truck parameters as detected by the delivery truck control unit 240 as well as delivery truck parameters as detected by other delivery truck control units associated with other delivery trucks. In doing so, as the operation parameters and/or the UAV route parameters are adjusted during the operation of the UAV 150 and the delivery truck parameters as adjusted during the operation of the delivery truck 110, the UAV delivery monitoring system 230 may monitor the operation parameters, UAV delivery truck parameters, and/or the delivery truck parameters in real-time via the network 210. Real-time is the monitoring of the operation parameters generated during the current state of the UAV 150, the monitoring of UAV route parameters generated during the current state of the current environment that the UAV 150 is currently operating, and the delivery truck parameters generated during the current state of the delivery truck 110. Real-time is also the monitoring of operation parameters, UAV route parameters, and/or the delivery truck parameters via the network 210 after each time interval is concluded.

A delivery truck control unit 240 associated with a delivery truck 110 may detect a plurality of delivery truck parameters associated with an operation of the delivery truck 110 as the delivery truck maneuvers along a roadway to execute a roadway delivery route. The delivery truck parameters are generated from the operation of the delivery truck 110 as the delivery truck executes the roadway delivery route. The delivery truck parameters may be indicative as to the operation of the delivery truck 110 as the delivery truck executes the roadway delivery route. In doing so, the UAV operation controller 120 may continuously monitor the delivery truck parameters to automatically adjust the operation of the UAV 150 based on the delivery truck parameters. Further, the UAV delivery monitoring system 230 may also continuously monitor the delivery truck parameters to provide guidance to the driver of the delivery truck 110 as to the roadway delivery route that the driver should execute relative to the UAV 150 executing the airborne delivery route.

For simplicity, the following discussion below is with regard to a single UAV 150 and interaction with a single delivery truck 110 and a single delivery truck control unit 240. However, as discussed above, the UAV 150 may also interact as discussed below with numerous different delivery trucks with corresponding delivery truck control units that are within the overall airborne operation radius of the UAV 150 as well as numerous different fixed locations within the overall airborne operation radius of the UAV 150. Further, numerous UAVs may interact with numerous different delivery trucks with corresponding delivery truck control units that are within the overall airborne operation radii of the different UAVs such that the UAVs and the delivery trucks may interchange with each other to increase the efficiency of completing the overall delivery routes for each of the different delivery trucks. Further numerous UAVs may interact with numerous different fixed locations that are within the overall airborne operation radii of the different UAVs such that the UAVs and the delivery trucks and/or the fixed locations may interchange with each other to increase the efficiency of completing the overall delivery routes for each of the different delivery trucks and/or the completing of the delivering of packages to the different fixed locations.

The UAV operation controller 120 may monitor the delivery truck parameters associated with the delivery truck 110 as the delivery truck maneuvers along the roadway delivery route and the UAV 150 maneuvers along the airborne delivery route and the return destination route. The UAV 150 may initiate the airborne delivery route from the delivery truck 110 and may return to the return destination of the delivery truck 110 via the return destination route after completing the airborne delivery route. The UAV operation controller 120 may automatically adjust the operation of the UAV 150 as the UAV 150 maneuvers along the airborne delivery route and the return destination route to maintain the operation of the UAV 150 within the operation threshold based on the operation parameters, the UAV route parameters, and the delivery truck parameters. The operation threshold of the UAV 150 is maintained within the overall airborne operation radius of the UAV 150 from the return destination of the delivery truck 110 that the UAV 150 is launched from to execute the airborne delivery route and the return destination route thereby enabling the UAV 150 to execute the delivery of the package along the airborne delivery route and return to the return destination of the delivery truck 110 via the return destination route.

As noted above, the UAV 150 may be associated with the delivery truck 110 in that the driver of the delivery truck 110 is tasked with completing the overall delivery route. The overall delivery route is the delivery route in which the delivery truck 110 is loaded with packages that are to be delivered to different locations along the delivery route. The overall delivery route begins with the delivery truck 110 departing with the packages to deliver to a first delivery location on the overall delivery route and then completing the delivery route after delivering the final package at the final delivery location on the overall delivery route. However, as discussed above, the overall delivery route is not limited to be completed solely by the delivery truck 110 delivering each package to each delivery location on the overall delivery route.

Rather, the UAV 150 may assist the delivery truck 110 in completing the overall delivery route. The UAV 150 may deliver packages to different delivery locations along the overall delivery route by delivering such packages along the airborne delivery routes. The delivery truck 110 may deliver packages to different delivery locations along the overall delivery route by delivering packages to different delivery locations along the roadway delivery route. The roadway delivery route is the delivery route executed by the delivery truck 110 in delivering the packages along the overall delivery route but doing so by driving along the roadway. As noted above, the UAV 150 may execute the delivering of packages along the airborne delivery route simultaneously as the delivery truck 110 executes the delivering of packages along the roadway delivery route to decrease the duration of time required to complete the overall delivery route.

Figure 3:
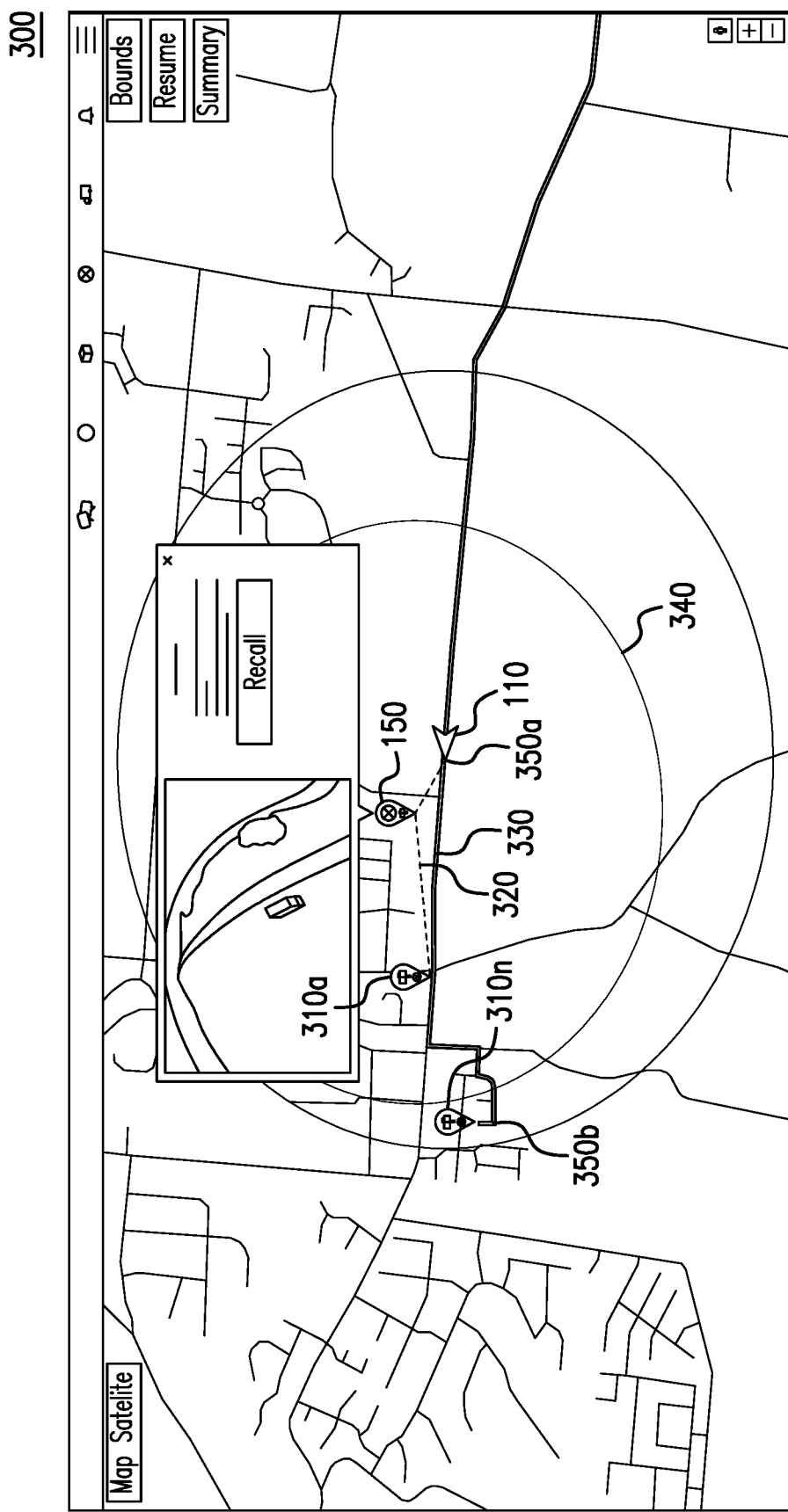
FIG. 3 illustrates a UAV delivery monitoring display that may display to a user via the user interface a UAV delivery monitoring display that the UAV launches from the delivery truck and then travels along the airborne delivery route to deliver a first package to the delivery location.

For example, as shown in FIG. 3, the UAV delivery monitoring system 230 may display to a user via the user interface 260 a UAV delivery monitoring display 300 that the UAV 150 launches from the delivery truck 110 and then travels along the airborne delivery route 320 to deliver a first package to the delivery location 310*a*. The delivery truck 110 may then execute the roadway delivery route to deliver the package to the delivery location 310*n* in that both the delivery location 310*a* and the delivery location 310*n* are both located on the overall delivery route. However, the UAV 150 delivers the package to the delivery location 310*a* and the delivery truck 110 delivers a second package to delivery location 310*n* thereby decreasing the overall duration to execute the overall delivery route. The UAV delivery monitoring system 230 may also monitor the operation parameters, the UAV route parameters, and/or the delivery truck parameters in a similar manner as the UAV operation controller 120. In doing so, the UAV delivery monitoring system 230 may display via the user interface 260 to the user the location of the UAV 150, the location of the delivery truck 110, the airborne delivery route 320, the return destination route, the roadway delivery route, the overall delivery route, the delivery locations, and so on in real-time such that the user may observe in real-time. The user may be the driver of the delivery truck 110 and/or a remote operator located remote from the delivery truck 110 and/or the UAV 150.

The UAV operation controller 120 may automatically adjust the operation of the UAV 150 as the UAV 150 maneuvers along the airborne delivery route 320 to deliver the package to the delivery location 310(*a-n*) when the UAV 150 launches from the delivery truck 110 positioned at a first location to maintain the operation of the UAV 150 within the operation threshold based on the operation parameters, the UAV route parameters, and the delivery truck parameters. The UAV operation controller 120 may automatically adjust the operation of the UAV 150 as the UAV 150 maneuvers along a return destination route to return to the return destination of the delivery truck 110 after the UAV 150 delivers the package to the delivery location to maintain the operation of the UAV 150 within the operation threshold. The return destination of the delivery truck 110 is positioned at a second location after the UAV 150 delivers the package to the delivery location that differs from the delivery truck 110 positioned at the first location when the UAV 150 launched from the delivery truck 110 to deliver the package to the delivery location.

As noted above, the delivery truck 110 may execute the roadway delivery route 330 to deliver the packages to the delivery locations 310(*a-n*) via the roadway delivery route 330 simultaneously with the UAV 150 as the UAV 150 executes the airborne delivery route 320 to deliver the package to the delivery location 310(*a-n*) via the airborne delivery route 320. The UAV operation controller 120 may maintain the operation of the UAV 150 within the operation threshold of the UAV 150 such that the UAV 150 is maintained within the overall airborne operation radius of the return destination of the delivery truck 110. As shown in FIG. 3, the overall airborne operation radius 340 depicts the radius that the UAV 150 is to be maintained by the UAV operation controller 320 to ensure that the UAV 150 is able to return to the return destination of the delivery truck 110. A failure to maintain the operation of the UAV 150 within the overall airborne operation radius 340 of the return destination of the delivery truck 110 may result in the UAV 150 failing to reach the return destination of the delivery truck 110. In order to decrease the duration of the overall delivery route, the delivery truck 110 may be continuously moving along the overall delivery route to deliver packages along the roadway delivery route 330 simultaneously as the UAV 150 is executing the airborne delivery route 320 or the return destination route. In doing so, an increased number of packages is delivered in a decreased duration with the simultaneous operation of the delivery truck 110 and the UAV 150.

However, the operation of the delivery truck 110 may be continuously changing based on the delivery truck parameters and the operation of the UAV 150 may be continuously changing based on the operation parameters and/or the UAV route parameters as the delivery truck 110 maneuvers along the roadway delivery route 330 simultaneously with the UAV 150 maneuvering along the airborne delivery route 330 or the return destination route. In doing so, the overall airborne operation radius 340 may also be continuously changing based on the operation of the delivery truck 110 and the UAV 150. For example, as the delivery truck 110 executes the roadway delivery route 330 simultaneously as the UAV 150 executes the airborne delivery route, the overall airborne operation radius 340 may continuously change based on the distance between the delivery truck 110 and the UAV 150, the speed in which the delivery truck 110 is travelling along the roadway delivery route 330 and the UAV 150 is travelling along the airborne delivery route 320 or the return destination route, the duration of time in which the delivery truck 110 stops for the driver to deliver a package at the delivery location 310(a-n) and also the UAV 150 and so on. Thus, the overall airborne operation radius 340 is continuously changing based on the operation parameters, UAV route parameters, and/or the delivery truck parameters and the UAV operation controller 120 may continuously adjust the operation of the UAV 150 to ensure the UAV 150 is maintained within the overall airborne operation radius 340.

For example as shown in FIG. 3, the UAV delivery monitoring system 230 may display to the user that the UAV 150 may launch to execute the airborne delivery route 320 to delivery location 310a when the delivery truck 110 is positioned at location 350a. However, in order to decrease the duration of the completion of the overall delivery route, the delivery truck 110 may commence to execute the roadway delivery route 330 to the delivery location 310n at the location 350b simultaneously as the UAV 150 delivers the package to delivery location 310a. In doing so, numerous operation parameters and/or UAV route parameters may continuously change based on the operation of the UAV 150 as the UAV 150 maneuvers along the airborne delivery route 320 and numerous delivery truck parameters may continuously change based on the operation of the delivery truck 110 as the delivery truck 110 maneuvers along the roadway delivery route 330. In doing so, the overall airborne operation radius 340 displayed by the UAV delivery monitoring system 230 may also continuously change.

In such an example, the UAV operation controller 120 may ensure that the UAV 150 when maneuvering along the airborne operation delivery route 320 to deliver the package at the delivery location 310a is maintained within the overall airborne operation radius 340 as the delivery truck 110 maneuvers along the roadway delivery route 350 to deliver the package to the delivery location 310n. In such an example, the UAV delivery monitoring system 230 depicts that the delivery location 310n is outside of the overall airborne operation radius 340. Thus, as the delivery truck 110 proceeds to the delivery location 310n, the UAV operation controller 320 may ensure that the operation of the UAV 150 shifts the overall airborne operation radius 340 to maintain the UAV 150 within the overall airborne operation radius 340 to ensure the UAV 150 returns the delivery truck 110 at the location 350b.

The UAV operation controller 120 and/or the UAV delivery monitoring system 230 and/or the delivery truck control unit 240 may also ensure that the delivery truck 110 when maneuvering along the roadway delivery route 330 is maintained within the overall airborne operation radius 340 as the UAV 150 maneuvers along the airborne destination route 320 or the return destination route. In doing so, the UAV operation controller 120 and/or the UAV delivery monitoring system 230 and/or the delivery truck control unit 240 may automatically adjust the operation of the delivery truck 110 based on the delivery truck parameters as the delivery truck 110 maneuvers along the roadway delivery route 330 and based on the operation parameters and/or UAV route parameters as the UAV 150 maneuvers along the airborne destination route 320 or the return destination route to ensure that the delivery truck 110 is maintained within the overall airborne operation radius 340 of the UAV 150.

For example, the UAV operation controller 120 and/or the UAV delivery monitoring system 230 may automatically alert the delivery truck control unit 240 when the current location of the UAV 150 is beyond the overall airborne operation radius of the UAV 150 from the return destination of the delivery truck 110. The UAV 150 is not capable of returning to the return destination of the delivery truck 110 when the current location of the UAV 150 is beyond the overall airborne operation radius of the UAV 150. In such an example, the UAV delivery monitoring system 230 may alert the driver via the user interface 260 via the delivery truck control unit 240 positioned on the delivery truck 110 that the current location of the delivery truck 110 is no longer within the overall airborne operation radius of the UAV 150. In doing so, the driver of the delivery truck 110 may identify the alert via the user interface 260 and then adjust the operation of the delivery truck 110 to return to a location that is within the overall airborne operation radius of the UAV 150.

In another example, UAV operation controller 120, the UAV delivery monitoring system 230 and/or the delivery truck control unit 240 may automatically adjust the operation of the delivery truck 110 to maintain the operation of the UAV 150 within the overall airborne operation radius 340. In such an example, the UAV 150 may have completed the delivery of the package at the delivery location 310a and is commencing the return destination route to the delivery truck 110. However, the delivery truck 110 is travelling at a speed that is exceeding the speed in which the UAV 150 is travelling and preventing the UAV 150 from maintaining the overall airborne operation radius 340 as the delivery truck 110 travels along the roadway delivery route 330 to the delivery location 310n. Based on the operation parameters and/or the UAV route parameters of the UAV 150 and the delivery truck parameters of the delivery truck 110, delivery truck control unit 240 may automatically reduce the speed of the delivery truck 110 as the delivery truck 110 maneuvers along the roadway destination route 330 to a speed that enables the UAV 150 to maintain the overall airborne operation radius 340 from the delivery truck 110 to ensure that the UAV 150 returns to the return destination of the delivery truck 110.

The UAV delivery monitoring system 230 may also automatically update the delivery truck control unit 240 and/or the driver of the delivery truck 110 via the user interface 260 as to an updated roadway delivery route 330 for the delivery truck 110 to execute as the UAV 150 is delivering the packages to the delivery locations via the airborne delivery route 320. As noted above, the UAV 150 may simultaneously deliver packages to delivery locations via the airborne delivery route 320 as the delivery truck 110 is delivering packages along the roadway delivery route 330. However, the roadway delivery route 330 that the delivery truck 110 is to follow in order to decrease the duration of the overall delivery route may continuously change based on the packages delivered by the UAV 150 and/or the location and/or operation of the UAV 150 in real-time relative to the location and/or operation of the delivery truck 110. As the delivery truck 110 maneuvers along the roadway delivery route to deliver a package to an initial delivery location, that initial delivery location may no longer be the appropriate delivery location for the delivery truck 110 to proceed based on the location of the UAV 150 and/or the delivery location that the UAV 150 is currently handling to further decrease the duration of the overall delivery route. Rather, the UAV delivery monitoring system 230 may automatically update the delivery truck control unit 240 and/or the driver of the delivery truck 110 as to the an updated delivery location and an updated roadway delivery route 330 for the delivery truck 110 to adjust to in order to continue to decrease the duration of completing the overall delivery route.

Figure 4:
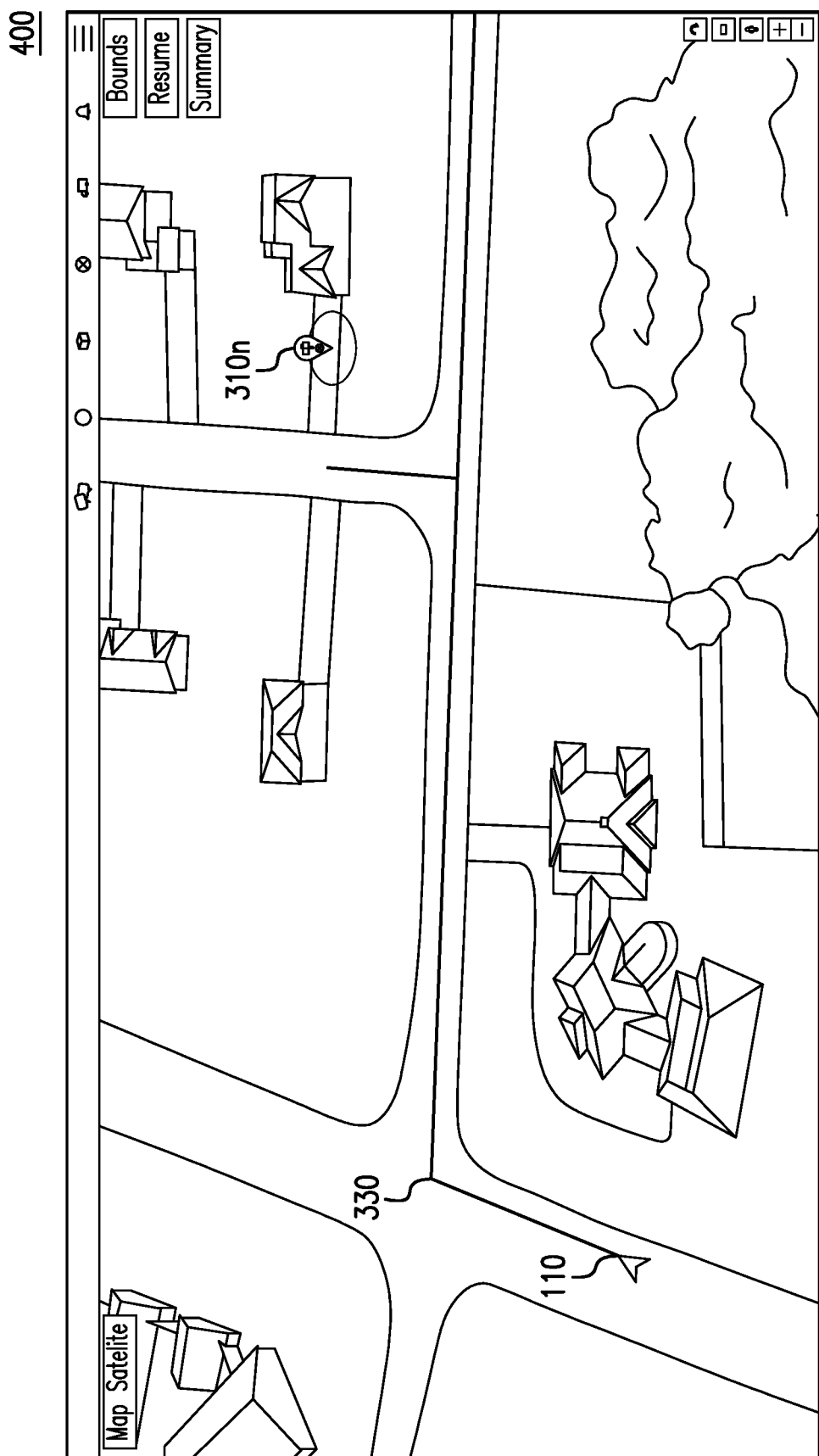
FIG. 4 illustrates a UAV delivery monitoring display that may display to the driver of the delivery truck via the user interface the UAV delivery monitoring display.

For example as shown in FIG. 4, the UAV delivery monitoring system 230 may display to the driver of the delivery truck 110 via the user interface 260 the UAV delivery monitoring display 400. The delivery truck 110 may be travelling along an initial roadway delivery route to an initial delivery location. However, the UAV 150 may be currently positioned beyond the overall airborne operation radius 340 as the UAV 150 is completing a delivery at a delivery location. The amount of time required for the UAV 150 to return to the delivery truck 110 to be equipped with another package to execute another delivery at another delivery location on the overall delivery route may be significantly increased due to the UAV 150 currently positioned beyond the overall airborne operation radius 340.

Rather, the UAV delivery monitoring system 330 may automatically determine a revised roadway delivery route 330 with a revised delivery destination 310n that positions the delivery truck 110 within a decreased distance from the UAV 150 for the UAV 150 to travel to the delivery truck 110 as the delivery truck 110 delivers the package at the revised delivery destination as compared to the significantly increased distance should the delivery truck 110 had proceeded to the initial delivery location along the initial roadway delivery route. The UAV delivery monitoring system 230 may automatically display to the driver a revised roadway delivery route 330 with a revised delivery location 310n for the delivery truck 110 to proceed to thereby decreasing the distance the UAV 150 is to travel to reach the delivery truck 110. In doing so, the amount of time in which the UAV 150 is travelling without a package is decreased thereby decreasing the overall duration of the completion of the overall delivery route as the number of packages that the UAV 150 is able to deliver via the airborne delivery routes 120 is increased.

The UAV operation controller 120, the UAV delivery monitoring system 230, and the delivery truck control unit 240 may incorporate the numerous operation parameters, the numerous UAV route parameters, and the numerous delivery truck parameters simultaneously in automatically adjusting the operation of the UAV 150 and the delivery truck 110 in real-time as the UAV 150 maneuvers along the airborne delivery route 320 and/or the return destination route and the delivery truck 110 maneuvers along the roadway delivery route 330. In doing so, the UAV operation controller 120, the UAV delivery monitoring system 230, and the delivery truck control unit 240 may account for the numerous different operation parameters, UAV route parameters, and delivery truck parameters simultaneously into the automatic adjustment of the operation of the UAV 150 and the delivery truck 110 in that each of the numerous different operation parameters, UAV route parameters, and delivery truck parameters may simultaneously impact the operation of the UAV 150 and the delivery truck 110 in real-time. Thus, the UAV 150 may maneuver along the airborne delivery route 320 or the return destination route and the delivery truck 110 may maneuver along the roadway delivery route 330 as operated by the UAV operation controller 120, the UAV delivery monitoring system 230, and/or the delivery truck control unit 240 to account for the changing operation parameters, UAV route parameters, and delivery truck parameters in real-time to continuously decrease the duration of completing the overall delivery route.

The delivery truck parameters may include but are not limited to the velocity of the delivery truck 110, the acceleration of the delivery truck 110, the distance travelled by the delivery truck 110 on the roadway delivery route 330, the current distance between the delivery truck 110 and the UAV 150, the total distance travelled by the delivery truck 110, the current drive energy in kWh, the efficiency in kWh per mile, the amount of miles that the delivery truck 110 has exceeded 55 MPH, the amount of miles the delivery truck 110 has engaged in overboost, the quantity of stops, the range of state of charge during the route, current total efficiency in MPGe, current battery energy in kWh, the amount of regen braking in kWh, the amount of auxiliary energy in kWh, the current voltage for each battery cell included in the drive battery, the minimum temperature of the battery cells during the route, the maximum temperature of the battery cells during the route, and the current ambient temperature. The delivery truck parameters may be any type of parameter that impacts the operation of the delivery truck 110 as the delivery truck 110 maneuvers along the roadway delivery route 330 relative to the operation of the UAV 150 that will be apparent to those skilled in the relevant art(s) without departing from the spirit and scope of the disclosure.

The UAV operation controller 120 may automatically adjust the operation of a first UAV 150 as the first UAV 150 maneuvers along a first airborne delivery route 320 to deliver a first package to a first delivery location when the first UAV 150 launches from the delivery truck 110 positioned at the first location and as the first UAV 150 maneuvers along a first return destination route to return to the return destination of the delivery truck 110 as the delivery truck 110 maneuvers along the roadway delivery route 330. The UAV operation controller 120 may also automatically adjust the operation of a second UAV as the second UAV maneuvers along a second airborne delivery route to deliver a second package to a second delivery location when the second UAV launches from the delivery truck 110 positioned at the first location and as the second UAV maneuvers along a second return destination route to return to the return destination of the delivery truck 110 as the delivery truck 110 maneuvers along the roadway delivery route 330.

The first UAV 150 and the second UAV launch from the delivery truck 110 to execute the first airborne delivery route 320 and the second airborne delivery route and return to the return destination of the delivery truck 110 as the delivery truck 110 maneuvers along the roadway delivery route 330. The UAV operation controller 120 may then automatically alert the delivery truck control unit 240 when a first current location of the first UAV 150 is beyond a first overall airborne operation radius of the first UAV 150 from the return destination of the delivery truck 110 and when a second current location of the second UAV is beyond a second overall airborne operation radius of the second UAV from the return destination of the delivery truck 110. The first overall airborne operation radius of the first UAV 150 differs from the second overall airborne operation radius of the second UAV based on the first current location of the first UAV 150 and the second current location of the second UAV.

For example as shown in FIG. 5, the UAV delivery monitoring system 230 may display to the user via the user interface 260 the UAV delivery monitoring display 500. Several UAVs 150(a-n), where n is an integer equal to or greater than one, may be associated with the delivery truck 110 in that more than one UAV 150(a-n) launches from the delivery truck 110 with each of the UAVs 150(a-n) delivering packages to different delivery locations 310(a-n) via different airborne delivery routes 320(a-n), where n is an integer that equals the number of UAVs 150(a-n). In doing so, the duration to complete the overall delivery route may be further decreased due to several UAVs 150(a-n) delivering packages simultaneously along different airborne delivery routes 320(a-n) simultaneously with the delivery truck 110 delivering packages to different delivery locations along the roadway delivery route 330. In such an example, a first UAV 150a may deliver a first package to a first delivery location 310a via a first airborne delivery route 320a simultaneously with a second UAV 150n may deliver a second package to a second delivery location 310n via a second airborne delivery route 320b simultaneously with the delivery truck 110 delivering packages along the roadway delivery route 330.

However, instead of a single overall airborne radius 340 associated with a single UAV 150 relative to the delivery truck 110, several different overall airborne radii 340(a-n), where n is an integer equal to the quantity of UAVs 150(a-n) are associated with each corresponding UAV 150(a-n) relative to the delivery truck 110 as well as other delivery trucks and/or fixed locations also positioned within the overall airborne operation radii 340(a-n) of the corresponding UAVs 150(a-n). In doing so, the UAV operation controller 120, the UAV delivery monitoring system 230, and/or the delivery truck control unit 240 as well as the other delivery truck control units associated with other delivery trucks positioned within the overall airborne operation radii 340(a-n) may continuously monitor the operation parameters and the UAV route parameters generated by each of the UAVs 150(a-n) as well as the delivery truck parameters generated by the delivery truck 110 as well as the delivery truck parameters generated by other delivery trucks positioned within the overall airborne operation radii 340(a-n).

As a result, the UAV operation controller 120 and/or the UAV delivery monitoring system 230 may continuously determine the overall airborne operation radius 340(a-n) for each of the UAVs 150(a-n) relative to the return destination of the delivery truck 110 as well as the other delivery trucks and/or fixed locations positioned within the overall airborne operation radii 340(a-n). The UAV operation controller 120, the UAV delivery monitoring system 230, and/or the delivery truck control unit 240 may then automatically adjust the operation of each of the UAV 150(a-n) as well as the delivery truck 110 as well as the other delivery trucks positioned and/or fixed locations within the overall airborne operation radii 340(a-n) to ensure that the current locations of each UAV 150(a-n) is within the corresponding overall airborne operation radius 340(a-n) of the return destination of the delivery truck 110 and the other delivery trucks and/or the other fixed locations to ensure the ach UAV 150(a-n) is able to return to the return destination of the delivery truck 110 and/or the other delivery trucks and/or fixed locations positioned within the overall airborne operation radii 340(a-n).

For example as shown in FIG. 5, the UAV delivery monitoring system 230 may display to the user via the user interface 240 in real-time a first UAV 150a that is travelling along a first airborne delivery route 320a to deliver a first package to the first delivery location 310a and a second UAV 150n travelling along a second airborne delivery route 320n to deliver a second package to the second delivery location 310n. The UAV delivery monitoring system 230 may also display the delivery truck 110 delivering packages to different delivery locations along the roadway delivery route 330 simultaneously with the first UAV 150a and the second UAV 150n. The UAV operation controller 120 and/or the UAV delivering monitoring system 230 may then automatically determine the first overall airborne operation radius 340a for the first UAV 150a and the second overall airborne operation radius 340n for the second UAV 150n in real-time as the first UAV 150a, the second UAV 150n, and the delivery truck 110 operate simultaneously.

The UAV delivering monitoring system 230 may continuously display via the user interface 240 in real-time the current location of the first UAV 150a, the second UAV 150n, and the delivery truck 110 as well as the first overall airborne operation radius 340a and the second overall airborne operation radius 340n as the first overall airborne operation radius 340a and 340n continuously change based on the operation of the first UAV 150a, the second UAV 150n, and the delivery truck 110. The UAV operation controller 120 and/or the UAV delivering monitoring system 230 may further generate an alert for the user and/or driver of the delivery truck indicating when the first UAV 150a is beyond the first overall airborne operation radius 340a and/or the second UAV 150b is beyond the second overall airborne operation radius 150n. Thus, the driver and/or the user may then adjust the operation of the delivery vehicle 110 and/or the first UAV 150a and/or the second UAV 150n to move the delivery vehicle 110 within both the first airborne operation radius of the first UAV 150a and the second airborne operation radius of the second UAV 150n and/or the user may adjust the operation. In doing so, both the first UAV 150a and the second UAV 150n may return to the return destination of the delivery truck 110. As previously discussed, the above may also be incorporated with different delivery trucks such that the first UAV 150a and/or the second UAV 150n may return to a second delivery truck that differs from the delivery truck 110 when returning to the different the second delivery truck has an increased efficiency for the first UAV 150a and/or the second UAV 150n as compared to returning to the delivery truck 110. As previously discussed, the above may also be incorporated with different fixed locations such that the first UAV 150a and/or the second UAV 150n may return to a fixed location that differs from the delivery truck 110 when returning to the fixed location has an increased efficiency for the first UAV 150a and/or the second UAV 150n as compared to returning to the delivery truck 110 and/or an initial launch location that is a fixed location.

The quantity of UAVs 150(a-n) that are associated with the delivery truck 110 and operate to deliver packages along the corresponding airborne delivery routes in assisting the delivery truck in executing the overall delivery route may be any quantity of UAVs 150(a-n) that may be launched from the delivery truck 110 and/or return to the delivery truck 110 to land that will be apparent to those skilled in the relevant art(s) without departing from the spirit and scope of the disclosure. The UAV operation controller 120 and/or the UAV delivery monitoring system 230 may then continuously adjust the operation of each of the UAVs 150(a-n) and the delivery truck control unit 240 may continuously maintain the delivery truck 110 within the overall airborne operation radii 340(a-n) for each of the UAVs 150(a-n).

The UAV operation controller 120 may automatically adjust the overall airborne operation radius 340 of the UAV 150 from the return destination based on the operation parameters and the UAV route parameters as the UAV 150 maneuvers along the airborne delivery route 320. The overall airborne operation radius 340 is increased or decreased based on the operation parameters and the UAV route parameters. The UAV operation controller 120 may automatically decrease the overall airborne operation radius 340 of the UAV 150 from the return destination when the operation parameters and the UAV route parameters impact the operation of the UAV 150 thereby decreasing the overall airborne operation radius 340 that the UAV 150 travels to execute the delivery of the package along the airborne delivery route 320 and to return to the return destination. The UAV operation controller 320 may automatically increase the overall airborne operation radius 340 of the UAV 150 from the return destination when the operation parameters and the UAV route parameters impact the operation of the UAV 150 thereby increase the overall airborne operation radius 340 that the UAV 150 travels to execute the delivery of the package along the airborne delivery route 320 and to return to the return destination.

The UAV operation controller 120 may automatically adjust a bubble that is displayed to a user that depicts the overall airborne operation radius 340(a-n) of the UAV 150 from the return destination 110 based on the at least one operation parameter and the at least one UAV route parameter as the UAV 150 maneuvers along the airborne delivery route 320(a-n). The bubble displayed to the user is increased or decreased based on the at least one operation parameter and the at least one UAV route parameter. The UAV operation controller 120 may automatically decrease the bubble displayed to the user of the overall airborne operation radius 340(a-n) of the UAV 150 from the return destination 110 when the at least one operation parameter and the at least one UAV route parameter impact the operation of the UAV 150 thereby decreasing the overall airborne operation radius 340(a-n) that the UAV 150 travels to execute the delivery of the package. The UAV operation controller 120 may automatically increase the bubble displayed to the user of the overall operation radius of the UAV 150 from the return destination 110 when the at least one operation parameter and the at least one UAV route parameter impact the operation of the UAV 150 thereby decreasing the overall airborne operation radius that the UAV 150 travels to execute the delivery of the package.

For example as shown in FIG. 6, the UAV delivery monitoring system 230 may display to the user via the user interface 260 the UAV delivery monitoring display 600 in real-time that the first UAV 150a that is travelling along the first airborne delivery route 320a and the second UAV 150n travelling along a second airborne delivery route 320n. As the first UAV 150a operates, the UAV operation controller 120 and/or the UAV delivery monitoring system 230 may automatically adjust the overall airborne operation radius 340a in real-time and in doing so automatically adjust the size of the bubble 620a displayed to the user in real-time by the UAV delivery monitoring system 230 via the user interface 260 to correspond to the overall airborne operation radius 340a in real-time. As the second UAV 150n operates, the UAV operation controller 120 and/or the UAV delivery monitoring system 230 may automatically adjust the overall airborne operation radius 340n in real-time and in doing so automatically adjust the size of the bubble 620n displayed to the user in real-time by the UAV delivery monitoring system 230 via the user interface 260 to correspond to the overall airborne operation radius 340n in real-time.

In doing so, the user may easily identify the overall airborne operation radius 340a for the first UAV 150a and the overall airborne operation radius 340n of the second UAV 150b in real-time based on the bubble 620a displayed for the first UAV 150a and the bubble 620n displayed for the second UAV 150n. The operation parameters and/or UAV route parameters may differ for the first UAV 150a from the second UAV 150n. As a result, the UAV operation controller 120 and/or the UAV delivery monitoring system 230 may determine the overall airborne operation radius 340a for the first UAV 150a resulting in the display of the first bubble 620a and the overall airborne operation radius 340n for the second UAV 150n resulting in the display of the second bubble 620n to differ from each other. As shown in FIG. 3, the first bubble 620a displayed is larger than the second bubble 620n in that the overall airborne operation radius 340a for the first UAV 150a is larger than the overall airborne operation radius 340n for the second UAV 150n.

As discussed above, the UAV operation controller 120 and/or the UAV delivery monitoring system 230 may generate an alert for the user when the location of the UAV 150(a-n) is beyond overall airborne operation radius 340(a-n) from the current location of the delivery truck 110 in real-time. In an embodiment, the UAV delivery monitoring system 230 may transition the color of the bubble 620(a-n) from a first color to a second color when the location of the UAV 150(a-n) is beyond the overall operation radius 340 (a-n) from the central location of the delivery truck 110 in real-time. In doing so, the user may easily identify via the user interface 260 when the color of the bubble 620(a-n) has transitioned from the first color to the second color thereby indicating current location of the UAV 150(a-n) currently beyond the overall airborne operation radius 340(a-n) from the current location of the delivery truck 110.

For example, the current location of the UAV 150n is beyond the overall airborne operation radius 340n of the current location of the delivery truck 110. The UAV delivery monitoring system 230 may transition the color of the bubble 620n from the color "green" to the color "red" as displayed via user interface 260 while the color of the bubble 620a remains the color "green". The transitioning of the bubble 620n from the color "green" to the color "red" may alert the user to take action to adjust the position of the UAV 150$n$ and/or the delivery truck 110 such that the location of the UAV 150$n$ moves back within the overall airborne operation radius 340$n$ of the delivery truck 110. The UAV delivery monitoring system 230 may then transition the color of the bubble 620$n$ from the color "red" to the color "green" once the current location of the UAV 150$n$ is back within the overall airborne operation radius 340$n$ of the current location of the delivery truck 110.

The functions and/or operations of the UAV controller 120, the UAV delivery monitoring system 230, and/or the delivery control truck unit 240 may execute any of the functions and/or operations independently of one another as discussed above in that any one of the UAV controller 120, the UAV delivery monitoring system 230, and/or the delivery truck control unit 240 may execute any of the functions and/or operations discussed above while the remaining do not execute any function and/or operation executed by one of the UAV controller 120, the UAV delivery monitoring system 230, and/or the delivery truck control unit 240. The UAV controller 120, the UAV delivery monitoring system 230, and/or the delivery truck control unit 240 may also execute any of the functions and/or operations discussed above in a shared manner in that any of the UAV controller 120, the UAV delivery monitoring system 230, and/or the delivery truck control unit 240 may share the execution of any of the functions and/or operations discussed above without limitation as to whether any of the functions and/or operations are executed independently by the UAV controller 120, the UAV delivery monitoring system 230, and/or delivery control unit 240. The functions and/or operations discussed above may be executed by any combination of the UAV controller 120, the UAV delivery monitoring system 230, and/or the delivery truck control unit 240 that will be apparent to those skilled in the relevant art(s) without departing from the spirit and scope of the disclosure.

The UAV delivery monitoring system 230 may be a device that is capable of electronically communicating with other devices. Examples of the UAV delivery monitoring system 230 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

The delivery truck control unit 240 may be a device that is capable of electronically communicating with other devices. Examples of the delivery truck control unit 240 may include a mobile telephone, a smartphone, a workstation, a portable computing device, other a radio, computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Communication between the operation parameter sensors 220($a$-$n$), the UAV operation controller 120, UAV route parameter detectors 250($a$-$n$), the UAV delivery monitoring system 230, the delivery truck control unit 240, and/or the UAV 150, may occur via wireless and/or wired connection communication. Wireless communication may occur via one or more networks 130 such as the internet or Wi-Fi wireless access points (WAP). In some embodiments, the network 130 may include one or more wide area networks (WAN) or local area networks (LAN). The network may utilize one or more network technologies such as Ethernet, Fast Ethernet, Gigabit Ethernet, virtual private network (VPN), remote VPN access, a variant of IEEE 802.11 standard such as Wi-Fi, and the like. Communication over the network 130 takes place using one or more network communication protocols including reliable streaming protocols such as transmission control protocol (TCP), Ethernet, Modbus, CanBus, EtherCAT, ProfiNET, BacNET, and/or any other type of network communication protocol that will be apparent from those skilled in the relevant art(s) without departing from the spirit and scope of the present disclosure. Wired connection communication may occur but is not limited to a fiber optic connection, a coaxial cable connection, a copper cable connection, and/or any other type of direct wired connection that will be apparent from those skilled in the relevant art(s) without departing from the spirit and scope of the present disclosure. These examples are illustrative and not intended to limit the present disclosure.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. An unmanned aerial vehicle (UAV) delivery control system to automatically manage an operation of an UAV as the UAV operates to deliver a package to a delivery location, comprising:

at least one sensor associated with the UAV that maneuvers on an airborne delivery route that is configured to detect at least one operation parameter associated with the UAV as the UAV maneuvers along the airborne delivery route to deliver the package to the delivery location, wherein the at least one operation parameter is indicative to an operation of the UAV as the UAV maneuvers on the airborne delivery route;

an UAV operation controller configured to:
monitor at least one UAV route parameter associated with the airborne delivery route as the UAV maneuvers along the airborne delivery route, wherein the at least one UAV route parameter is indicative as to a current environment of the airborne delivery route that the UAV is encountering as the UAV maneuvers along the airborne delivery route to deliver the package, and automatically adjust the operation of the UAV as the UAV maneuvers along the airborne delivery route to maintain the operation of the UAV within an operation threshold based on the at least one operation parameter and the at least one UAV route parameter, wherein the operation threshold is the operation of the UAV that is maintained within an overall airborne operation radius of the UAV from a return destination that the UAV is returning to after completing the delivery of the package thereby enabling the UAV to execute the delivery of the package along the airborne delivery route and to return to the return destination.

2. The UAV delivery control system of claim 1, further comprising:
a delivery truck control unit associated with at least one delivery truck that is configured to detect at least one delivery truck parameter associated with an operation of the at least one delivery truck as the at least one delivery truck maneuvers along a roadway to execute a roadway delivery route, wherein the at least one delivery truck parameter are generated from the operation of the at least one delivery truck as the at least one delivery truck executes the roadway delivery route.

3. The UAV delivery system of claim 2, wherein the UAV operation controller is further configured to:
monitor at least one delivery truck parameter associated with the at least one delivery truck as at least one delivery truck maneuvers along the roadway delivery route and the UAV maneuvers along the airborne delivery route and a return destination route, wherein the UAV initiates the airborne delivery route from the at least one delivery truck and returns to the return destination of the at least one delivery truck via the return destination route after completing the airborne delivery route; and automatically adjust the operation of the UAV as the UAV maneuvers along the airborne delivery route to maintain the operation of the UAV within the operation threshold based on the at least one operation parameter, the at least one UAV route parameter, and the at least one delivery truck parameter, wherein the operation threshold of the UAV is maintained within the overall airborne operation radius of the UAV from the return destination of the at least one delivery truck that the UAV is launched from to execute the airborne delivery route thereby enabling the UAV to execute the delivery of the package along the airborne delivery route and return to the at least one delivery truck via the return destination route.

4. The UAV delivery system of claim 3, wherein the UAV operation controller is further configured to:
automatically adjust the operation of the UAV as the UAV maneuvers along the airborne delivery route to deliver the package to the delivery location when the UAV launches from the at least one delivery truck positioned at a first location to maintain the operation of the UAV within the operation threshold based on the at least one operation parameter, the at least one UAV route parameter, and the at least one delivery truck parameter; and automatically adjust the operation of the UAV as the UAV maneuvers along a return destination route to return to the return destination of the at least one delivery truck after the UAV delivers the package to the delivery location to maintain the operation of the UAV within the operation threshold, wherein the return destination of the at least one delivery truck is positioned at a second location after the UAV delivers the package to the delivery location that differs from the at least one delivery truck positioned at the first location when the UAV launched from the at least one delivery truck to deliver the package to the delivery location.

5. The UAV delivery system of claim 4, wherein the UAV operation controller is further configured to:
automatically alert the delivery truck control unit when a current location of the UAV is beyond the overall airborne operation radius of the UAV from the return destination of the at least one delivery truck, wherein the UAV is not capable of returning to the return the destination of the at least one delivery truck when the current location of the UAV is beyond the overall airborne operation radius of the UAV.

6. The UAV delivery system of claim 5, wherein the UAV operation controller is further configured to:
automatically adjust the operation of a first UAV as the first UAV maneuvers along a first airborne delivery route to deliver a first package to a first delivery location when the first UAV launches from the at least one delivery truck positioned at the first location and as the first UAV maneuvers along a first return destination route to return to the return destination of the at least one delivery truck as the at least one delivery truck maneuvers along the roadway delivery route;

automatically adjust the operation of a second UAV as the second UAV maneuvers along a second airborne delivery route to deliver a second package to a second delivery location when the second UAV launches from the at least one delivery truck positioned at the first location and as the second UAV maneuvers along a second return destination route to return to the return destination of the at least one delivery truck as the at least one delivery truck maneuvers along the roadway delivery route, wherein the first UAV and the second UAV launch from the at least one delivery truck to execute the first delivery route and the second delivery route and return to the return destination of the at least one delivery truck as the at least one delivery truck maneuvers along the roadway delivery route; and automatically alert the delivery truck control unit when a first current location of first UAV is beyond a first overall airborne operation radius of the first UAV from the return destination of the at least one delivery truck and when a second current location of the second UAV is beyond a second overall airborne operation radius of the second UAV from the return destination of the at least one delivery truck, wherein the first operation radius of the first UAV differs from the second operation radius of the second UAV based on the first current location of the first UAV and the second current location of the second UAV.

7. The UAV delivery system of claim 1, wherein the UAV operation controller is further configured to:

automatically adjust the overall airborne operation radius of the UAV from the return destination based on the at least one operation parameter and the at least one UAV route parameter as the UAV maneuvers along the airborne delivery route, wherein the overall airborne operation radius is increased or decreased based on the at least one operation parameter and the at least one UAV route parameter.

8. The UAV delivery system of claim 6, wherein the UAV operation controller is further configured to:
automatically decrease the overall airborne operation radius of the UAV from the return destination when the at least one operation parameter and the and the at least one UAV route parameter impact the operation of the UAV thereby decreasing the overall airborne operation radius that the UAV travels to execute the delivery of the package along the airborne delivery route and to return to the return destination; and
automatically increase the overall airborne operation radius of the UAV from the return destination when the at least one operation parameter and the at least one UAV route parameter impact the operation of the UAV thereby increasing the overall airborne operation radius that the UAV travels to execute the delivery of the package along the airborne delivery route and to return to the return destination.

9. The UAV delivery system of claim 8, wherein the UAV operation controller is further configured to:
automatically adjust a bubble that is displayed to a user that depicts the overall operation radius of the UAV from the return destination based on the at least one operation parameter and the at least one UAV route parameter as the UAV maneuvers along the airborne delivery route, wherein the bubble displayed to the user is increased or decreased based on the at least one operation parameter and the at least one UAV route parameter.

10. The UAV delivery system of claim 9, wherein the UAV operation controller is further configured to:
automatically decrease the bubble displayed to the user of the overall airborne operation radius of the UAV from the return destination when the at least one operation parameter and the at least one UAV route parameter impact the operation of the UAV thereby decreasing the overall airborne operation radius that the UAV travels to execute the delivery of the package; and
automatically increase the bubble displayed to the user of the overall operation radius of the UAV from the return destination when the at least one operation parameter and the at least one UAV route parameter impact the operation of the UAV thereby decreasing the overall airborne operation radius that the UAV travels to execute the delivery of the package.

11. A method for automatically managing an operation of an unmanned aerial vehicle (UAV) as the UAV operates to deliver a package to a delivery location, comprising:
detecting at least one operation parameter associated with the UAV as the UAV maneuvers along the airborne delivery route to deliver the package to the delivery location, wherein the at least one operation parameter is indicative to an operation of the UAV as the UAV maneuvers along the airborne delivery route;
monitoring at least one UAV route parameter associated with the airborne delivery route as the UAV maneuvers along the airborne delivery route, wherein the at least one UAV route parameter is indicative as to a current environment of the airborne delivery route that the UAV is encountering as the UAV maneuvers along the airborne delivery route to deliver the package; and
automatically adjusting the operation of the UAV as the UAV maneuvers along the airborne delivery route to maintain the operation of the UAV within an operation threshold based on the at least one operation parameter and the at least one UAV route parameter, wherein the operation threshold is the operation of the UAV that is maintained within an overall airborne operation radius of the UAV from a return destination that the UAV is returning to after completing the delivery of the package thereby enabling the UAV to execute the delivery of the package along the airborne delivery route and to return to the return destination.

12. The method of claim 11, further comprising:
detecting at least one delivery truck parameter associated with an operation of at least one delivery truck as the at least one delivery truck maneuvers along a roadway to execute a roadway delivery route, wherein the at least one delivery truck parameter is generated from the operation of the at least one delivery truck as the at least one delivery truck executes the roadway delivery route.

13. The method of claim 12, further comprising:
monitoring at least one delivery truck parameter associated with the at least one delivery truck as the at least one delivery truck maneuvers along the roadway delivery route and the UAV maneuvers along the airborne delivery route a return destination route, wherein the UAV initiates the airborne delivery route from the at least one delivery truck and returns to the return destination of the at least one delivery truck via the return destination route after completing the airborne delivery route; and
automatically adjusting the operation of the UAV as the UAV maneuvers along the airborne delivery route to maintain the operation of the UAV within the operation threshold based on the at least one operation parameter, the at least one UAV route parameter, and the at least one delivery tuck parameter, wherein the operation threshold of the UAV is maintained within the overall airborne operation radius of the UAV from the return destination of the at least one delivery truck that the UAV is launched from to execute the airborne delivery route thereby enabling the UAV to execute the delivery of the package along the airborne delivery route and return to the at least one delivery truck via the return destination route.

14. The method of claim 13, further comprising:
automatically adjusting the operation of the UAV as the UAV maneuvers along the airborne delivery route to deliver the package to the delivery location when the UAV launches from the at least one delivery truck positioned at a first location to maintain the operation of the UAV within the operation threshold based on the at least one operation parameter, the at least one UAV route parameter, and the at least one delivery truck parameter; and
automatically adjusting the operation of the UAV as the UAV maneuvers along a return destination route to return to the return destination of the at least one delivery truck after the UAV delivers the package to the delivery location to maintain the operation of the UAV within the operation threshold, wherein the return destination of the at least one delivery truck is positioned at a second location after the UAV delivers the package to the delivery location that differs from the at least one delivery truck positioned at the first location when the UAV launched from the at least one delivery truck to deliver the package to the delivery location.

15. The method of claim 14, further comprising:
automatically alerting the at least one delivery truck control unit when a current location of the UAV is beyond the overall airborne operation radius of the UAV from the return destination of the at least one delivery truck, wherein the UAV is not capable of returning to the return destination of the at least one delivery truck when the current location of the UAV is beyond the overall airborne operation radius of the UAV.

16. The method of claim 15, further comprising:
automatically adjusting the operation of a first UAV as the first UAV maneuvers along a first airborne delivery route to deliver a first package to a first delivery location when the first UAV launches from the at least one delivery truck positioned at the first location and as the first UAV maneuvers along a first return destination route to return to the return destination of the at least one delivery truck as the at least one delivery truck maneuvers along the roadway delivery route;

automatically adjusting the operation of a second UAV as the second UAV maneuvers along a second airborne delivery route to deliver a second package to a second delivery location when the second UAV launches from the at least one delivery truck positioned at the first location and as the second UAV maneuvers along a second return destination route to return to the return destination of the at least one delivery truck as the at least one delivery truck maneuvers along the roadway delivery route, wherein the first UAV and the second UAV launch from the at least one delivery truck to execute the first delivery route and the second delivery route and return to the return destination of the at least one delivery truck as the truck maneuvers along the roadway delivery route; and automatically alerting the at least one delivery truck when a first current location of the first UAV is beyond a first overall airborne operation radius of the first UAV from the return destination of the at least one delivery truck and when a second current location of the second UAV is beyond a second overall airborne operation radius of the second UAV from the return destination of the at least one delivery truck, wherein the first operation radius of the first UAV differs from the second operation radius of the second UAV based on the first current location of the first UAV and the second current location of the second UAV.

17. The method of claim 11, further comprising:
automatically adjusting the overall airborne operation radius of the UAV from the return destination based on the at least one operation parameter and the at least one UAV route parameter as the UAV maneuvers along the airborne delivery route, wherein the overall airborne operation radius is increased or decreased based on the at least one operation parameter and the at least one delivery truck parameter.

18. The method of claim 17, further comprising:
automatically decreasing the overall airborne operation radius of the UAV from the return destination when the at least one operation parameter and the at least one UAV route parameter impact the operation of the UAV thereby decreasing the overall airborne operation radius that the UAV travels to execute the delivery of the package along the airborne delivery route and to return to the return destination; and automatically increasing the overall airborne operation radius of the UAV from the return destination when the at least one operation parameter and the at least one UAV route parameter impact the operation of the UAV thereby increasing the overall airborne operation radius that the UAV travels to execute the delivery of the package along the airborne delivery route and to return to the return destination.

19. The method of claim 18, further comprising:
automatically adjusting a bubble that is displayed to a user that depicts the overall airborne operation radius of the UAV from the return destination based on the at least one operation parameter and the at least one UAV route parameter as the UAV maneuvers along the airborne delivery route, wherein the bubble displayed to the user is increased or decreased based on the at least one operation parameter and the at least one UAV route parameter.

20. The method of claim 19, further comprising:
automatically decreasing the bubble displayed to the user of the overall airborne operation radius of the UAV from the return destination when the at least one operation parameter and the at least one UAV route parameter impact the operation of the UAV thereby decreasing the overall airborne operation radius that the UAV travels to execute the delivery of the package; and automatically increasing the bubble displayed to the user of the overall operation radius of the UAV from the return destination when the at least one operation parameter and the at least one UAV route parameter impact the operation of the UAV thereby decreasing the overall operation radius that the UAV travels to execute the delivery of the package.

* * * * *